United States Patent

Katsuhiro et al.

[11] Patent Number: 5,282,306
[45] Date of Patent: Feb. 1, 1994

[54] PROCESS FOR THE PREPARATION OF A DRAW-FORMED PRINTED CAN

[75] Inventors: Imazu Katsuhiro; Akihiko Machii, both of Yokohama; Masao Ishinabe, Atsugi; Tomomi Kobayashi, Yokohama, all of Japan

[73] Assignee: Toyo Seikan Kaisha, Ltd., Tokyo, Japan

[21] Appl. No.: 465,158

[22] PCT Filed: Jun. 15, 1989

[86] PCT No.: PCT/JP89/00615
§ 371 Date: Apr. 13, 1990
§ 102(e) Date: Apr. 13, 1990

[87] PCT Pub. No.: WO89/12801
PCT Pub. Date: Dec. 28, 1989

[30] Foreign Application Priority Data

Jun. 15, 1988 [JP] Japan ............... 63-145669
Jun. 30, 1988 [JP] Japan ............... 63-161025
Jul. 22, 1988 [JP] Japan ............... 63-181662

[51] Int. Cl.⁵ .................. B21D 22/20; B21D 31/00; B21D 51/26
[52] U.S. Cl. .................. 29/469.5; 29/DIG. 11; 72/349; 72/379.4; 156/224; 220/604; 283/81; 283/117; 355/52; 413/8
[58] Field of Search .......... 29/469.5, DIG. 11; 72/347, 348, 349, 379.4; 413/8, 78; 283/70, 81, 117; 156/212, 221, 224, DIG. 5, 277; 101/35, 36, 37, 41–44; 355/52, 47; 358/140, 444; 206/139; 220/640

[56] References Cited

U.S. PATENT DOCUMENTS

| 3,314,329 | 4/1967 | Wolbert ................. 355/52 X |
| 4,556,312 | 12/1985 | Vany ..................... 355/47 |
| 4,711,611 | 12/1987 | Bachmann et al. ...... 72/349 X |
| 4,935,079 | 6/1990 | Nelson-Ashley et al. ... 156/224 X |
| 4,956,906 | 9/1990 | Masse et al. ........... 29/407 X |
| 4,962,659 | 10/1990 | Imazu et al. ........... 72/349 |

FOREIGN PATENT DOCUMENTS

| 753446 | 2/1967 | Canada ................... 355/52 |
| 267053 | 11/1986 | Japan . |
| 267763 | 11/1986 | Japan . |
| 44743 | 2/1987 | Japan . |
| 93030 | 4/1987 | Japan . |
| 2061790 | 5/1981 | United Kingdom ...... 72/349 |
| 2103134 | 2/1983 | United Kingdom ...... 72/349 |
| 2240503 | 8/1991 | United Kingdom ...... 72/349 |
| WO83/00841 | 3/1983 | World Int. Prop. O. ... 413/8 |
| WO90/14179 | 11/1990 | World Int. Prop. O. ... 72/349 |

Primary Examiner—Mark Rosenbaum
Assistant Examiner—S. Thomas Hughes
Attorney, Agent, or Firm—Sughrue, Mion, Zinn, Macpeake & Seas

[57] ABSTRACT

The present invention relates to a process for preparing a printed can be draw-forming or draw-redraw-forming a preliminarily printed metal blank or laminate. By forming an original plate for printing by an image processing by a computer, a print image faithful to the original image can be manifested on the side wall portion of the can, and formation of an undesirable stripe pattern can be prevented. Furthermore, a print image excellent in the linearity can be displayed without an error on the draw-formed can in due consideration of the anisotropy owing to the plastic flow of the blank.

10 Claims, 29 Drawing Sheets

Fig. 1-A(1)
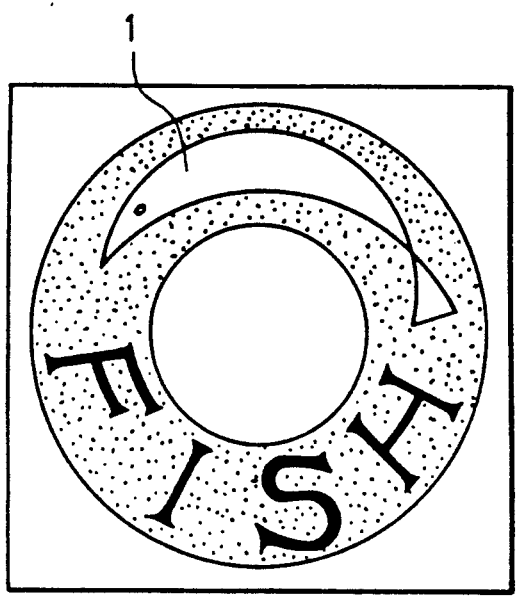
Fig. 1-A(2)
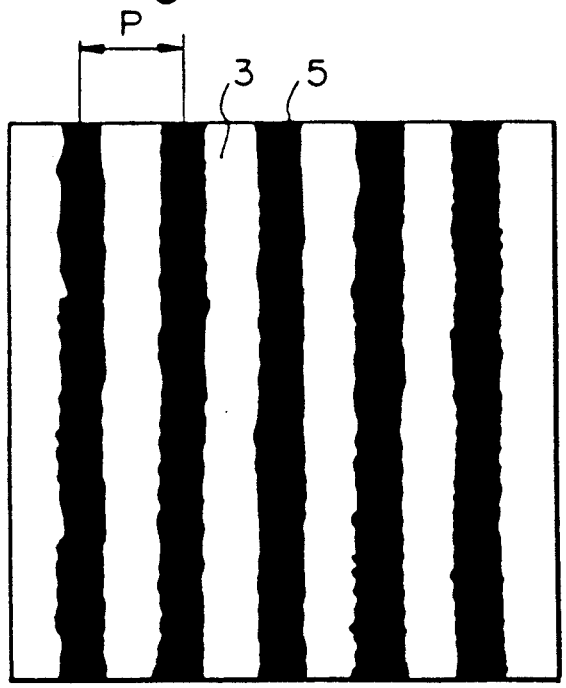

Fig. 1-B(1)
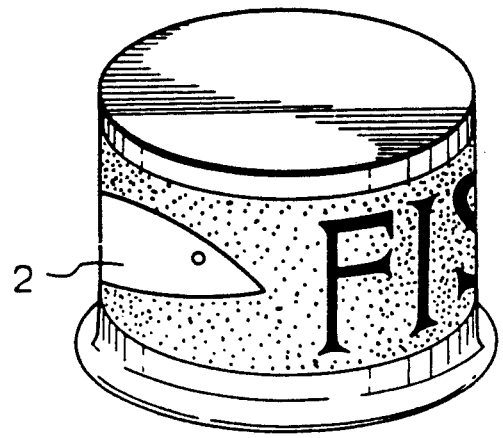
Fig. 1-B(2)
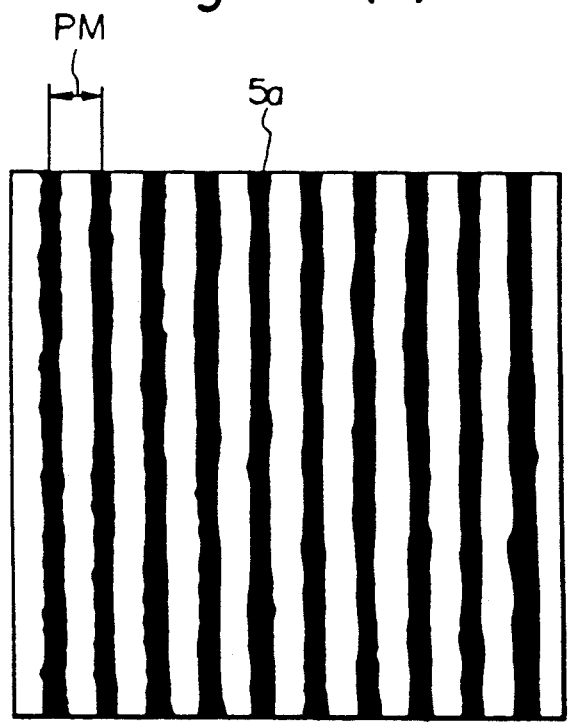

Fig. 2-A
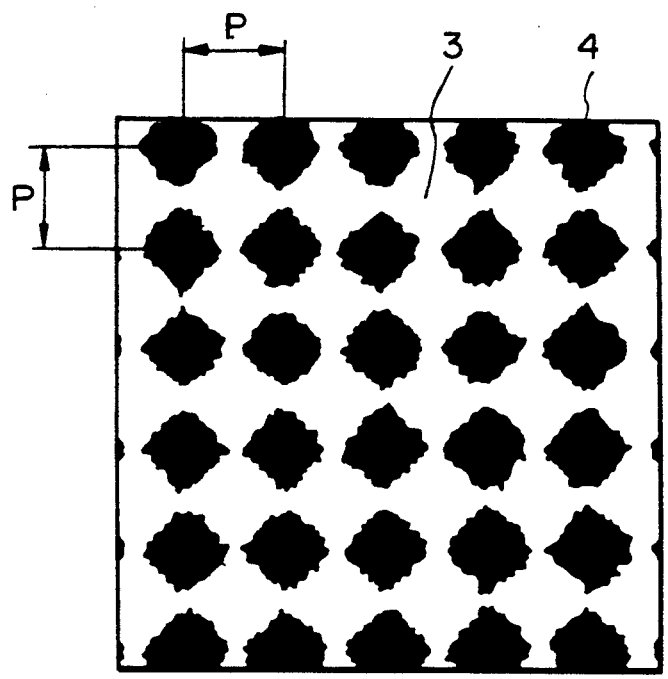
Fig. 2-B
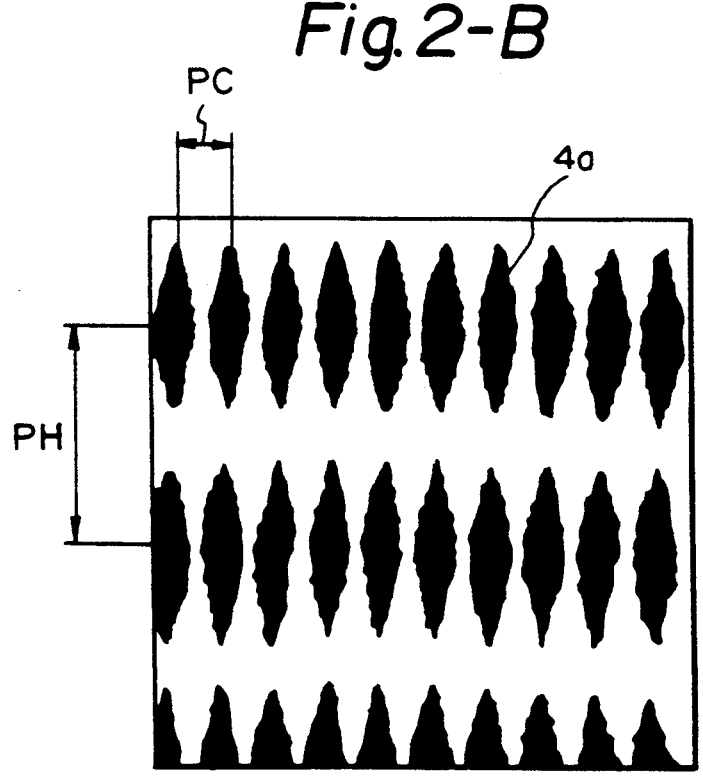

Fig.3-A
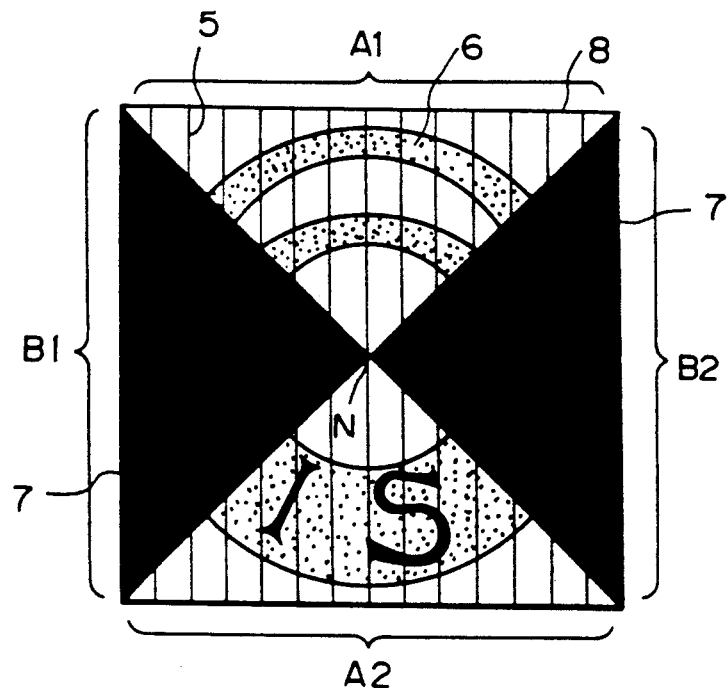
Fig.3-B
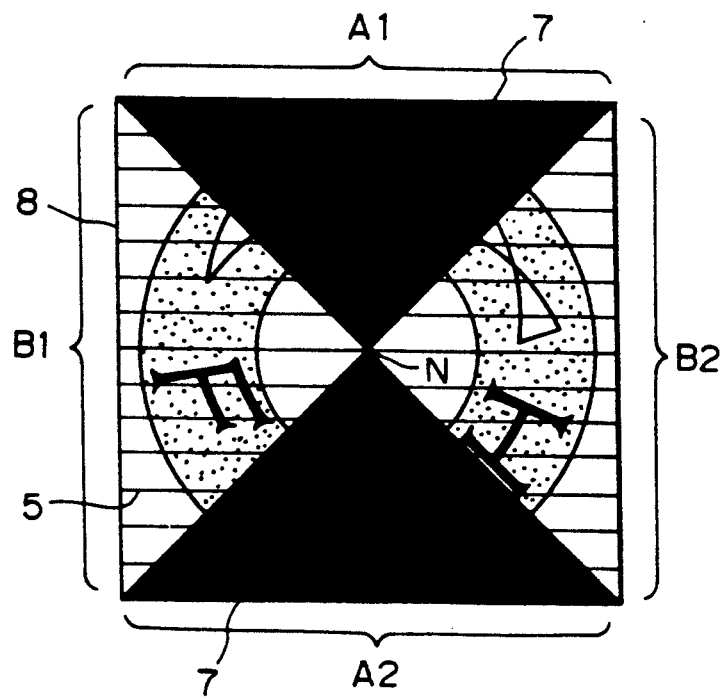

Fig. 3-C
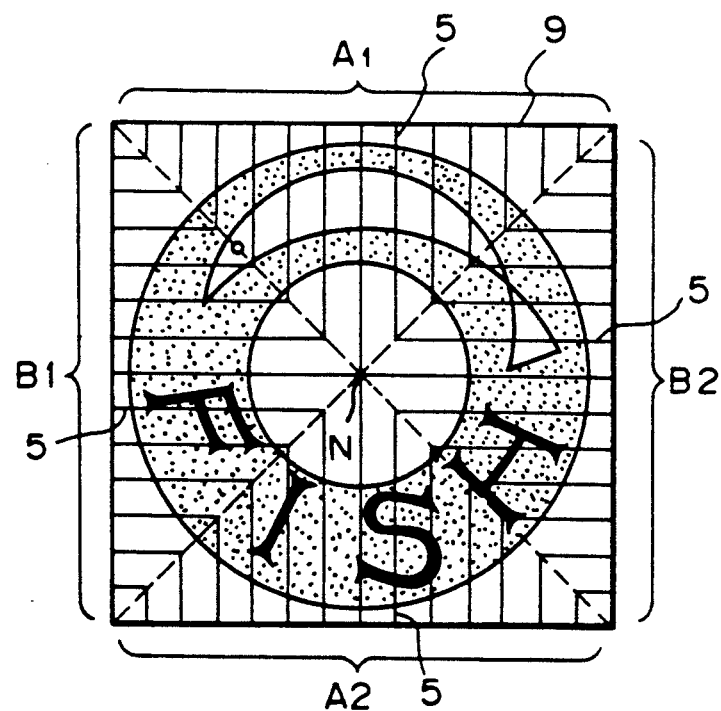

Fig. 4-A
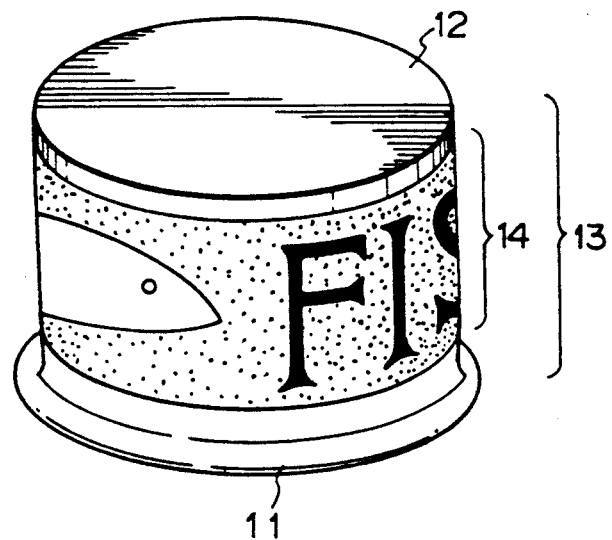
Fig. 4-B
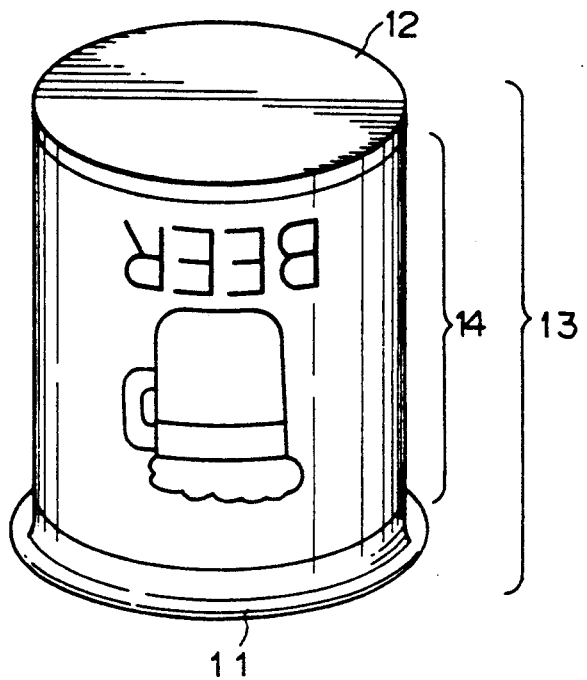

Fig. 5-A
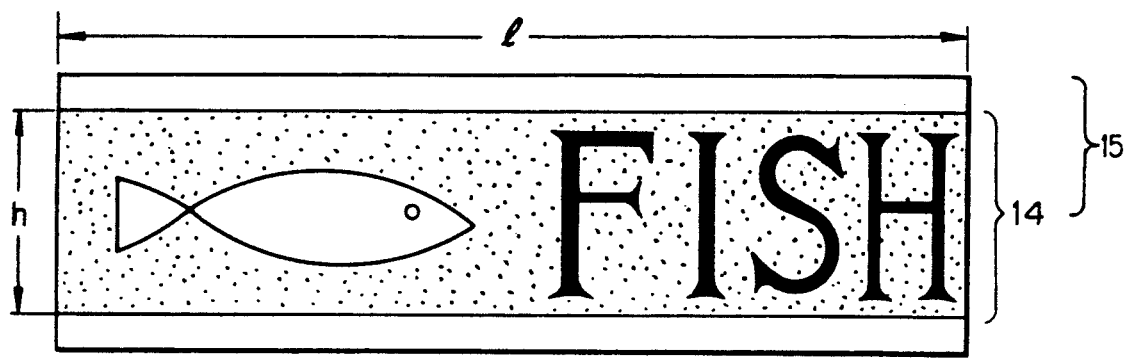
Fig. 5-B
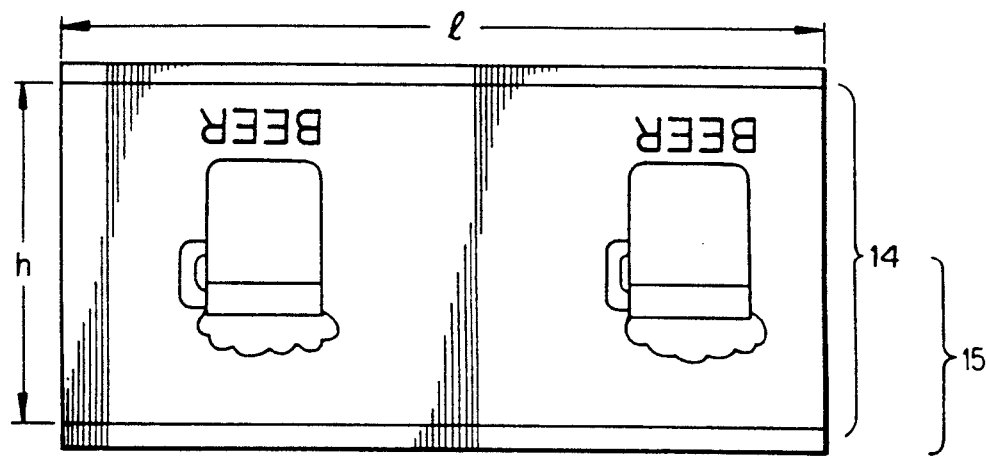

Fig. 6-A
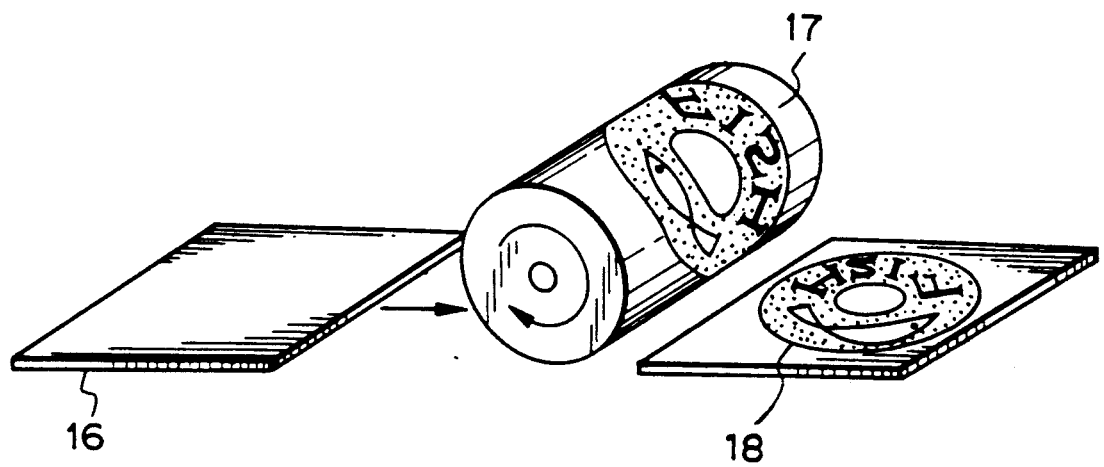
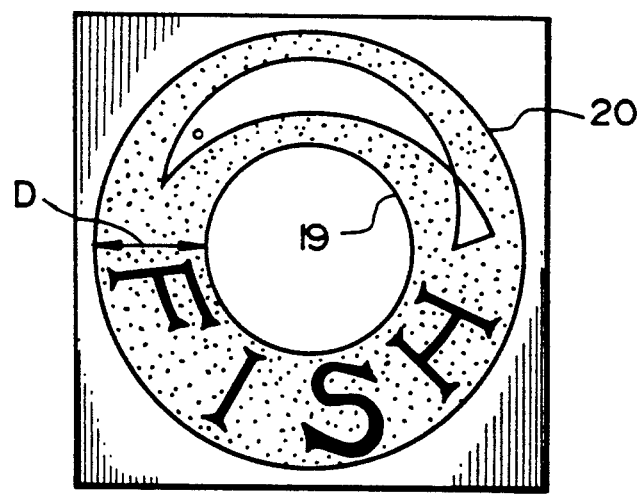

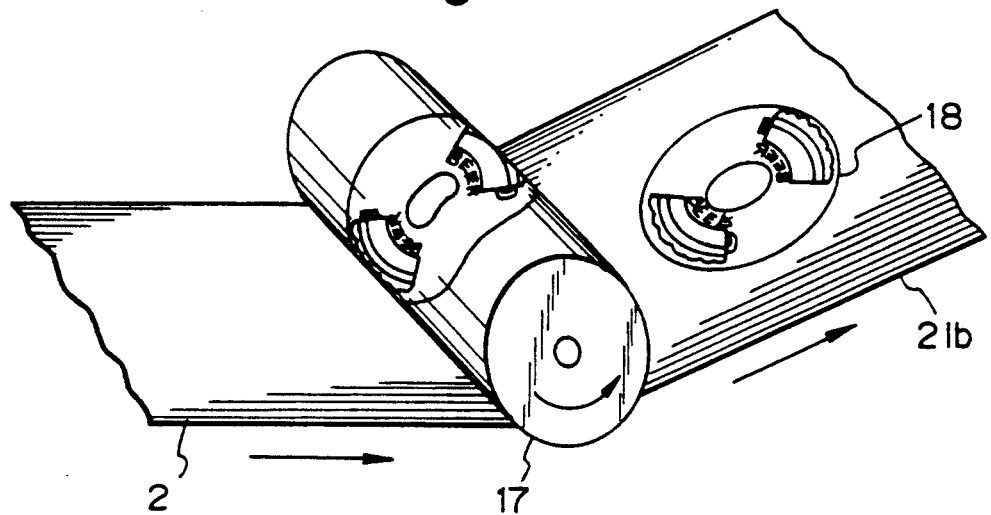
Fig.6-B
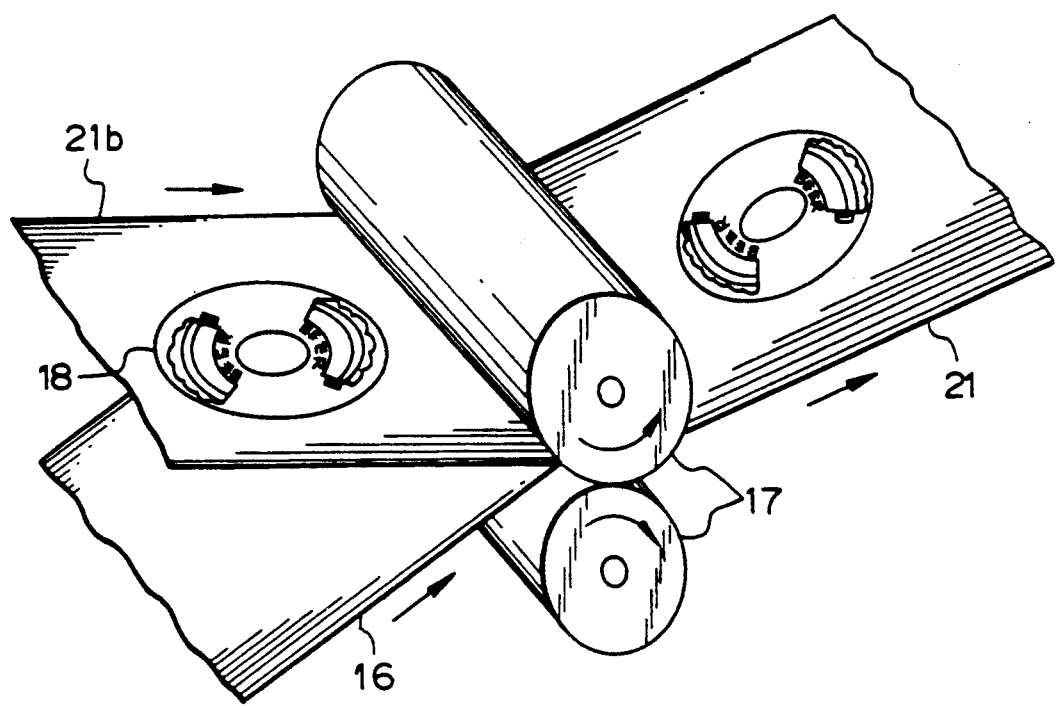
Fig.6-C

Fig. 7-A
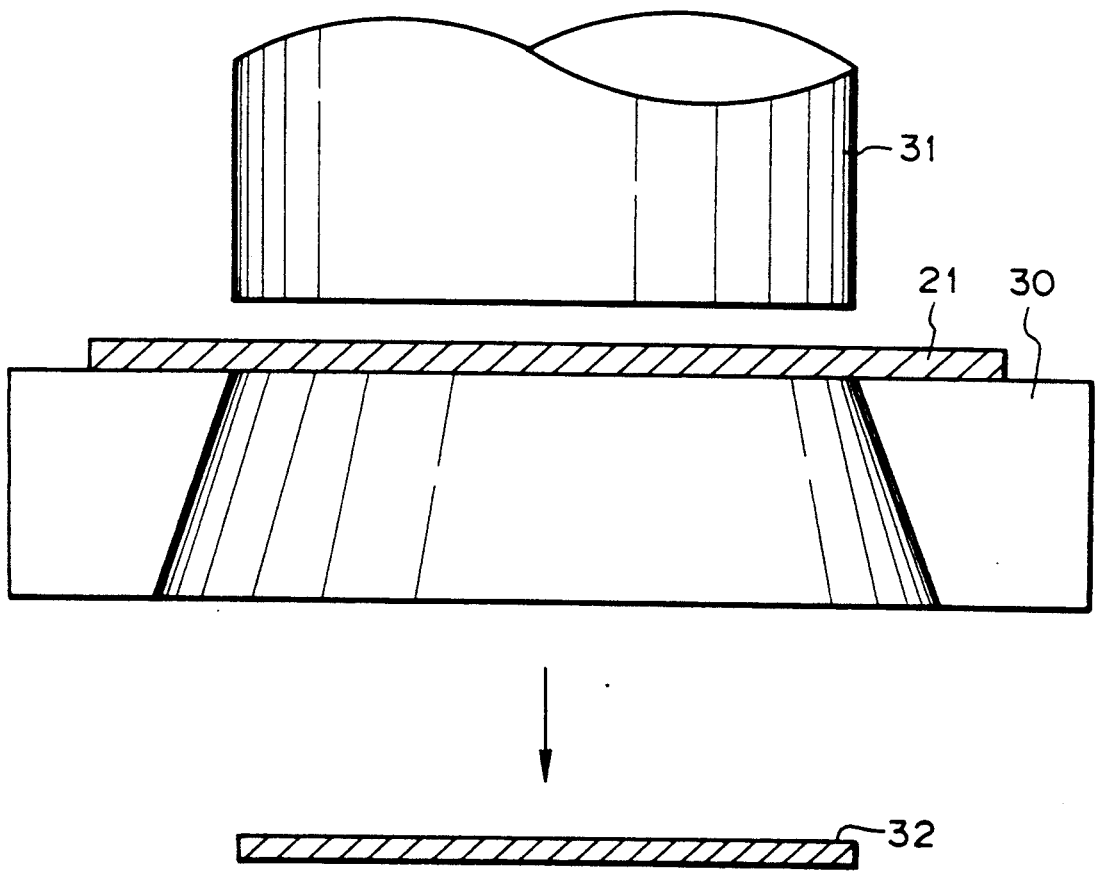

Fig.7-B
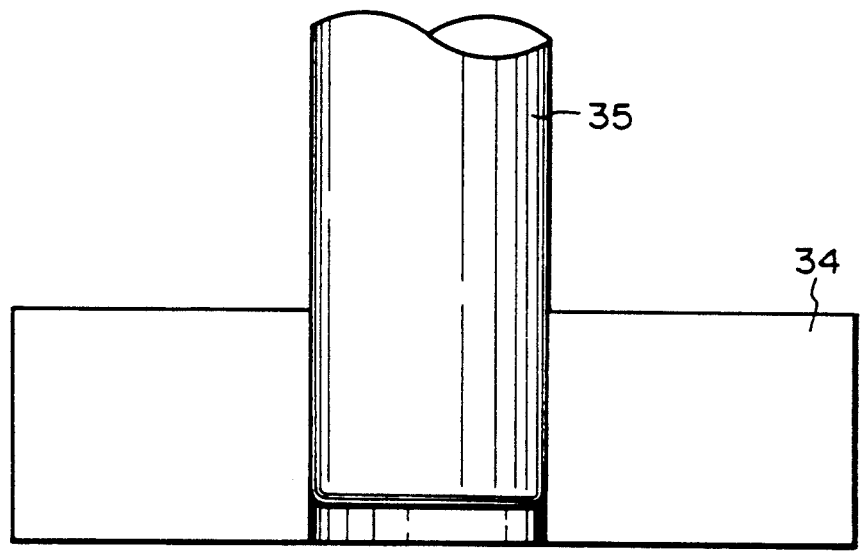
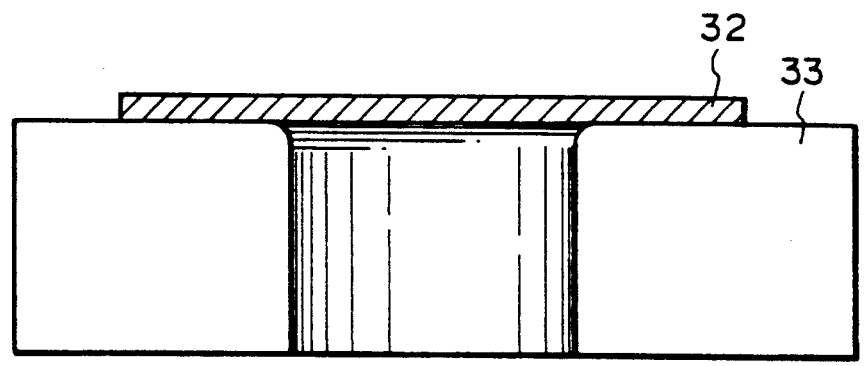

Fig. 7-C
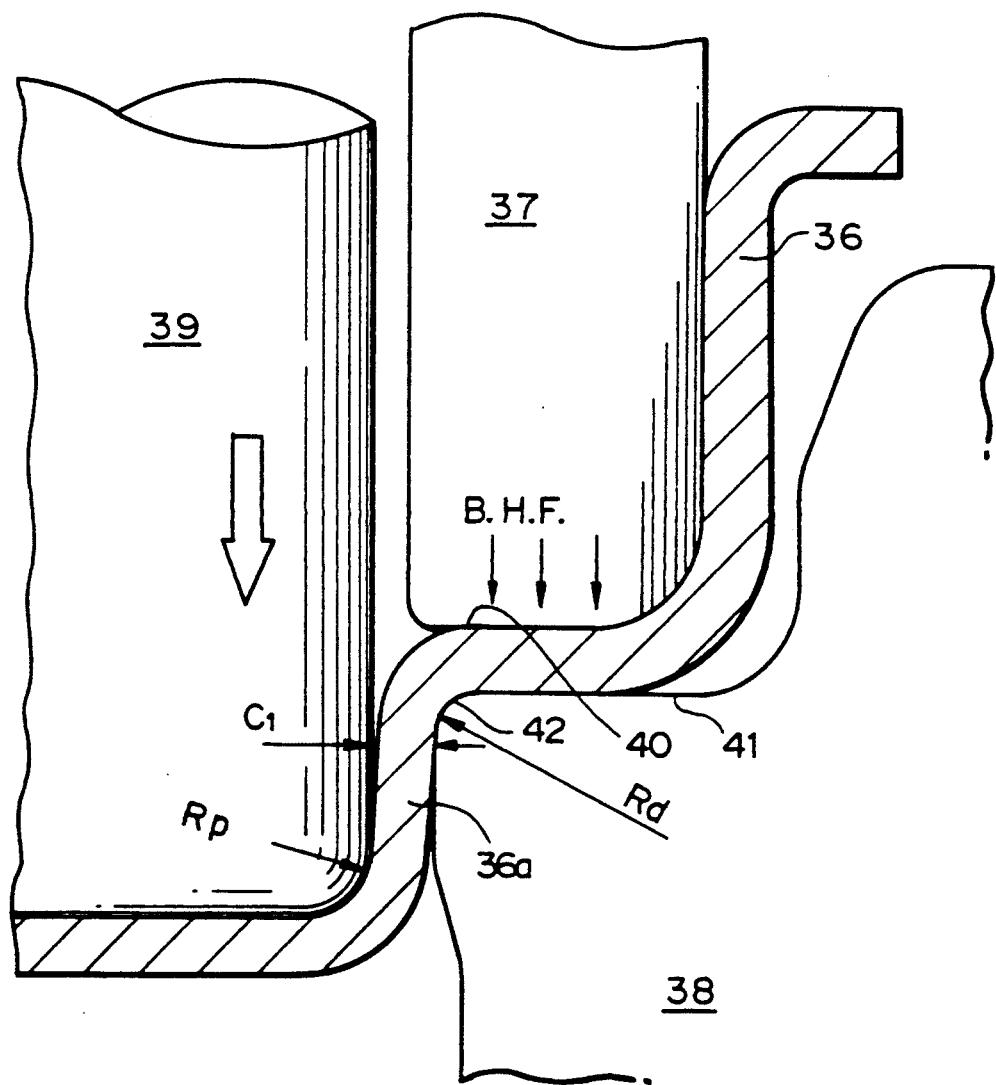

Fig.10-A
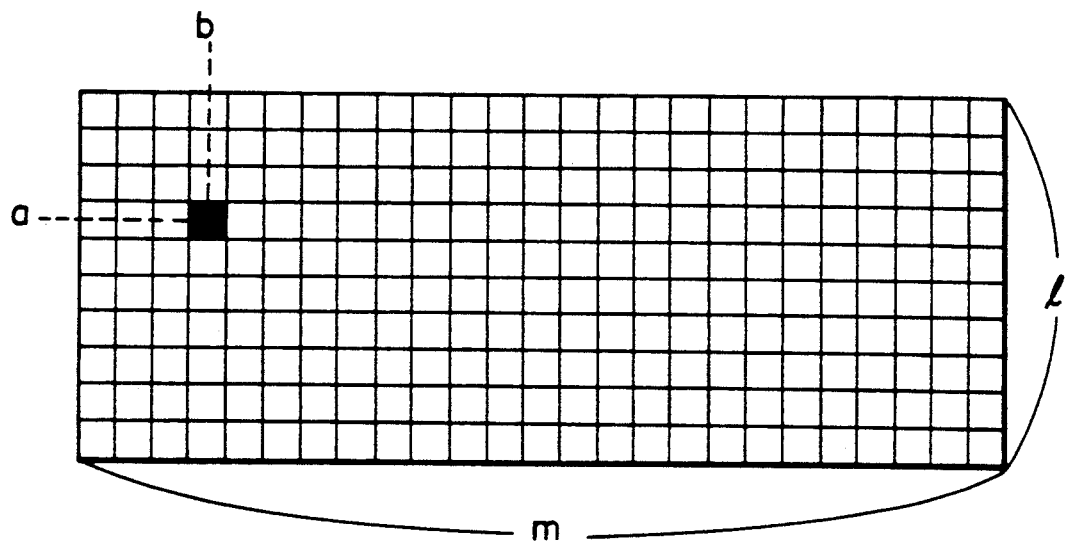
Fig.10-B
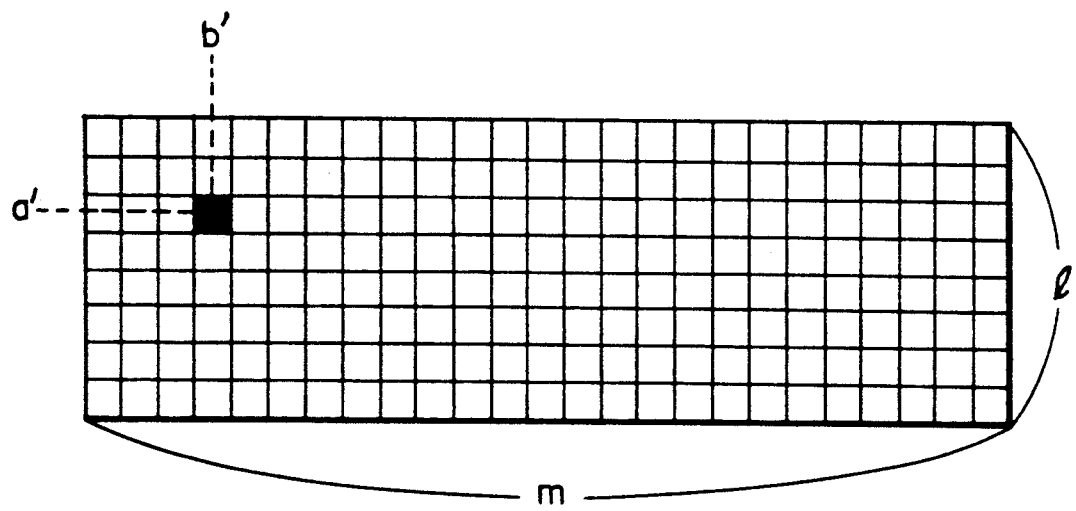

Fig.11-A
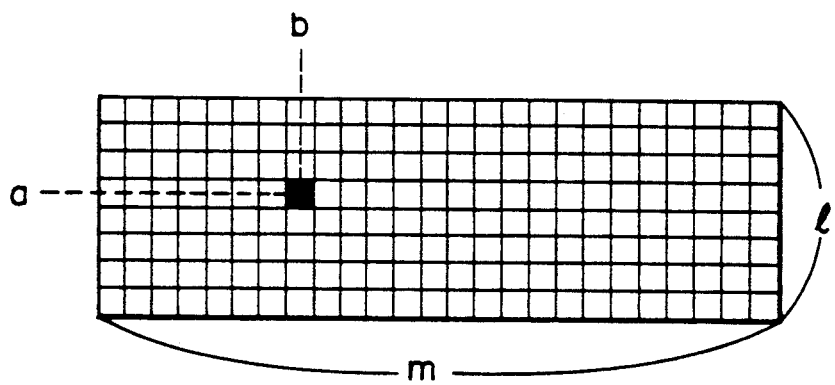
Fig.11-B
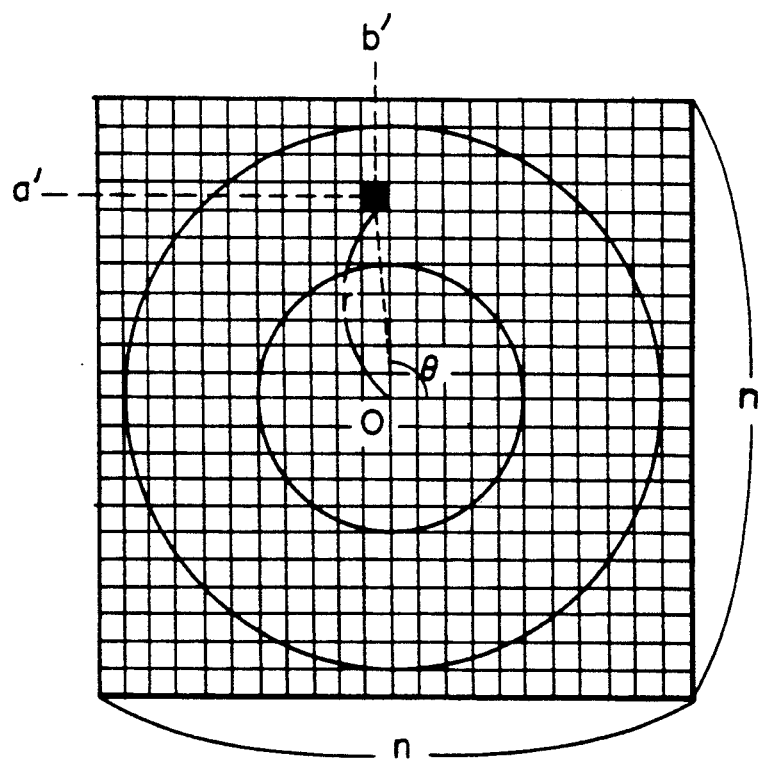

Fig. 14A

| Fig.14 |
|---|
| Fig.14A |
| Fig.14B |

[i] ① READING OF IMAGE DATA OF RECTANGULAR ORIGINAL

[ii] ② READING OF IMAGE DATA OF RECTANGULAR ORIGINAL

[iii] TRANSFORMATION OF ANNULAR COORDINATE ① → ①' ② → ②' RECORDING OF ①'

[viii] ② IS REGARDED AS ①

[ix] DATA OVER? — NO / YES

[x] y = 1

[xi] READING OF TRANSFORMED DATA WHERE Y COORDINATE IS y

[xii] REARRANGEMENT AND RECORDING OF READ DATA IN ORDER OF SMALLNESS OF X COORDINATE VALUE

[xiv] y = y + 1

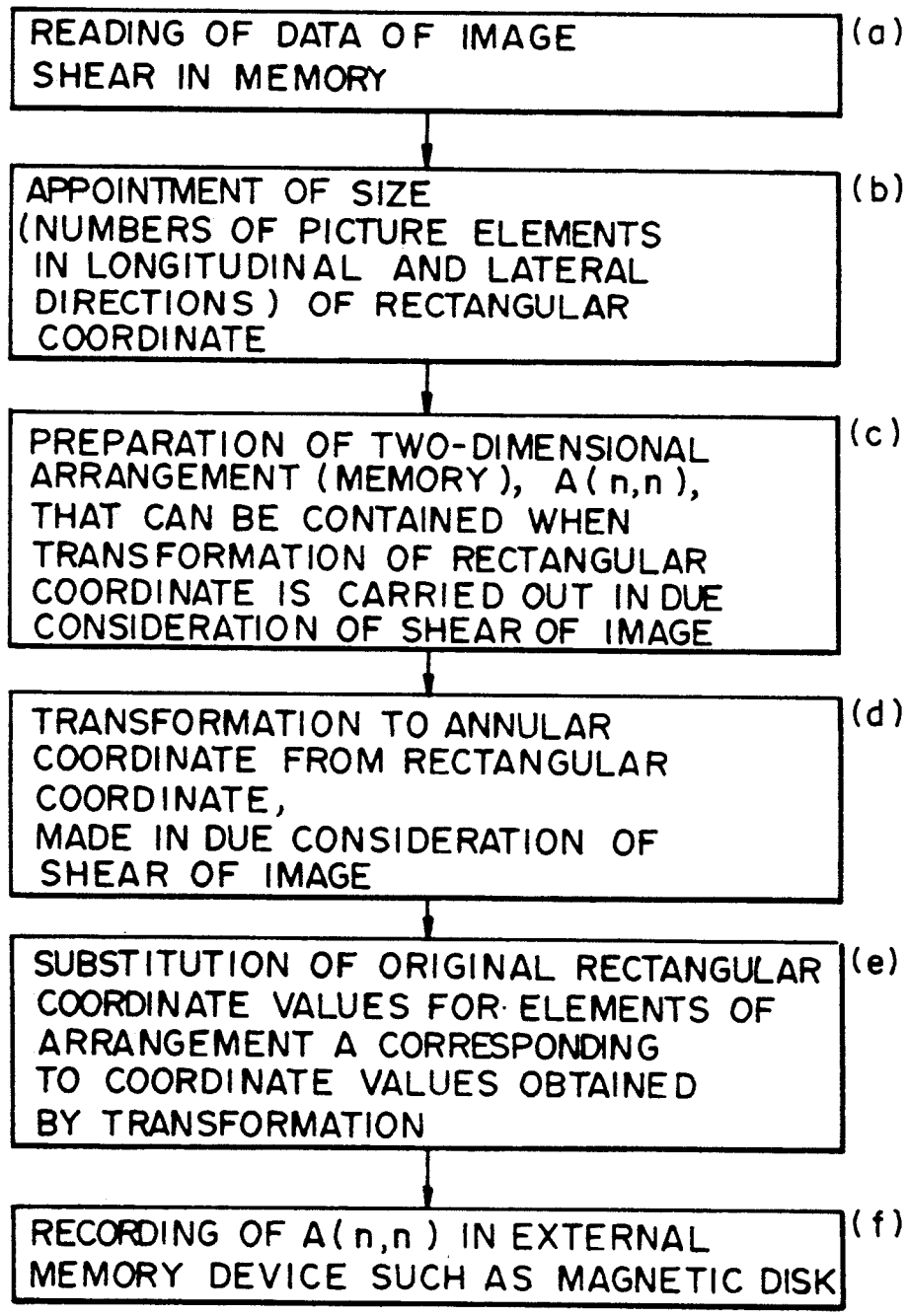

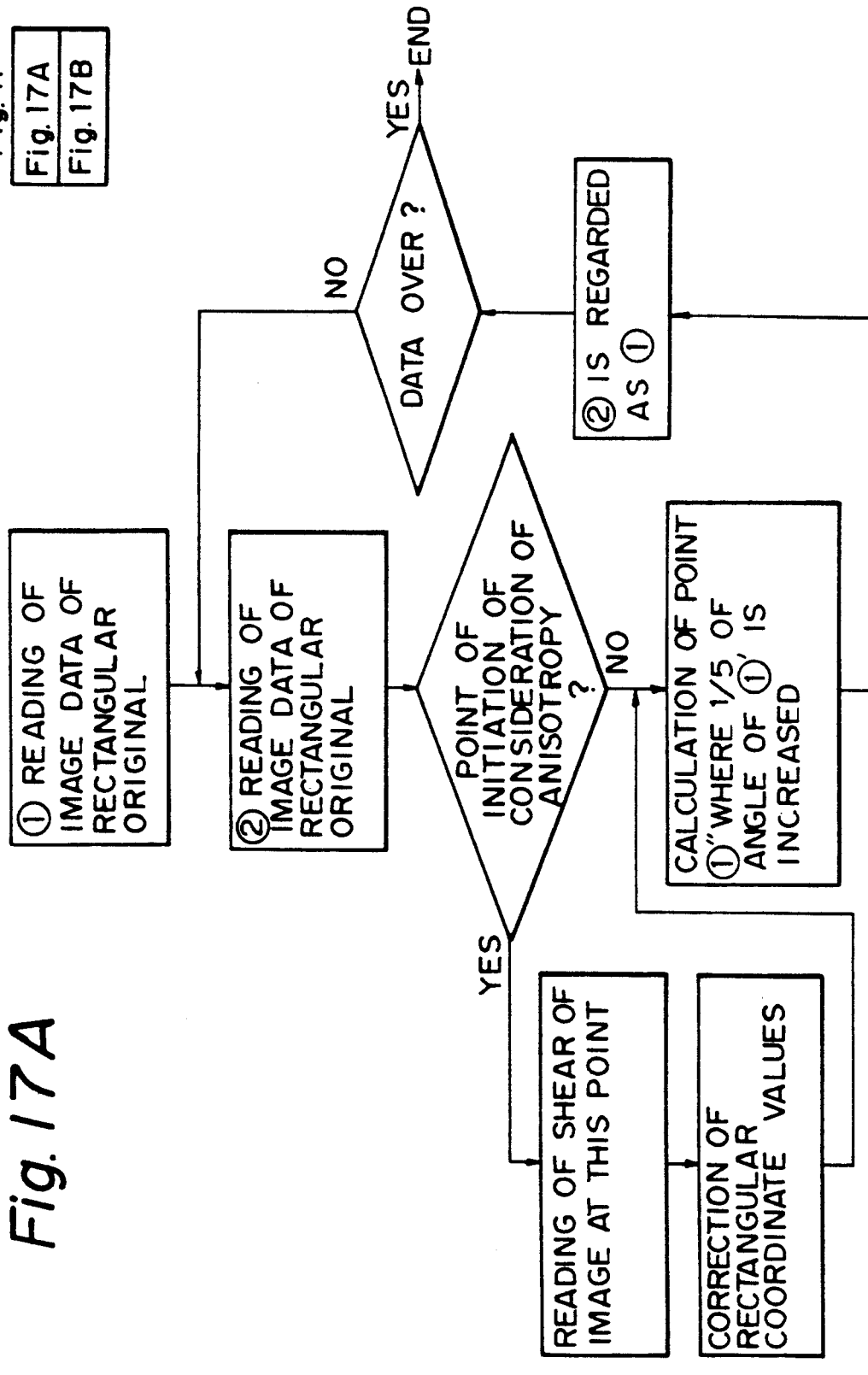

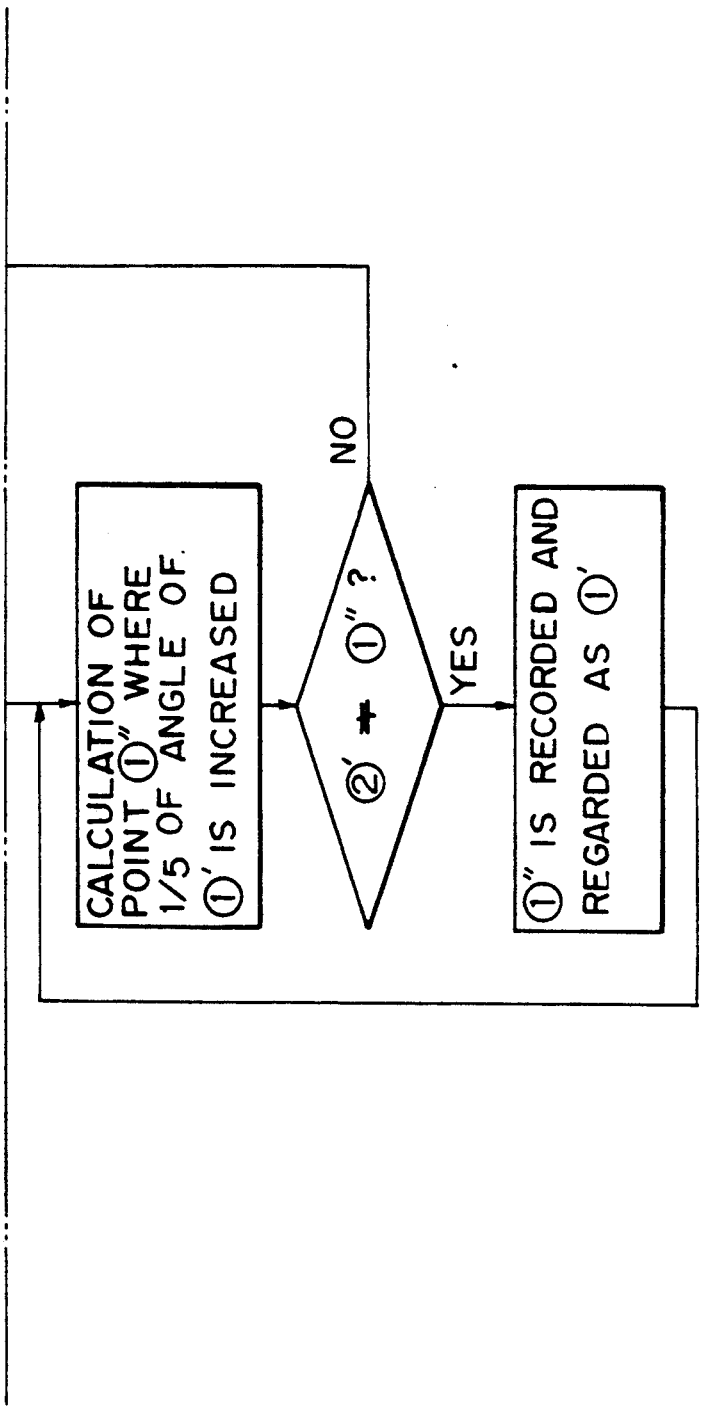

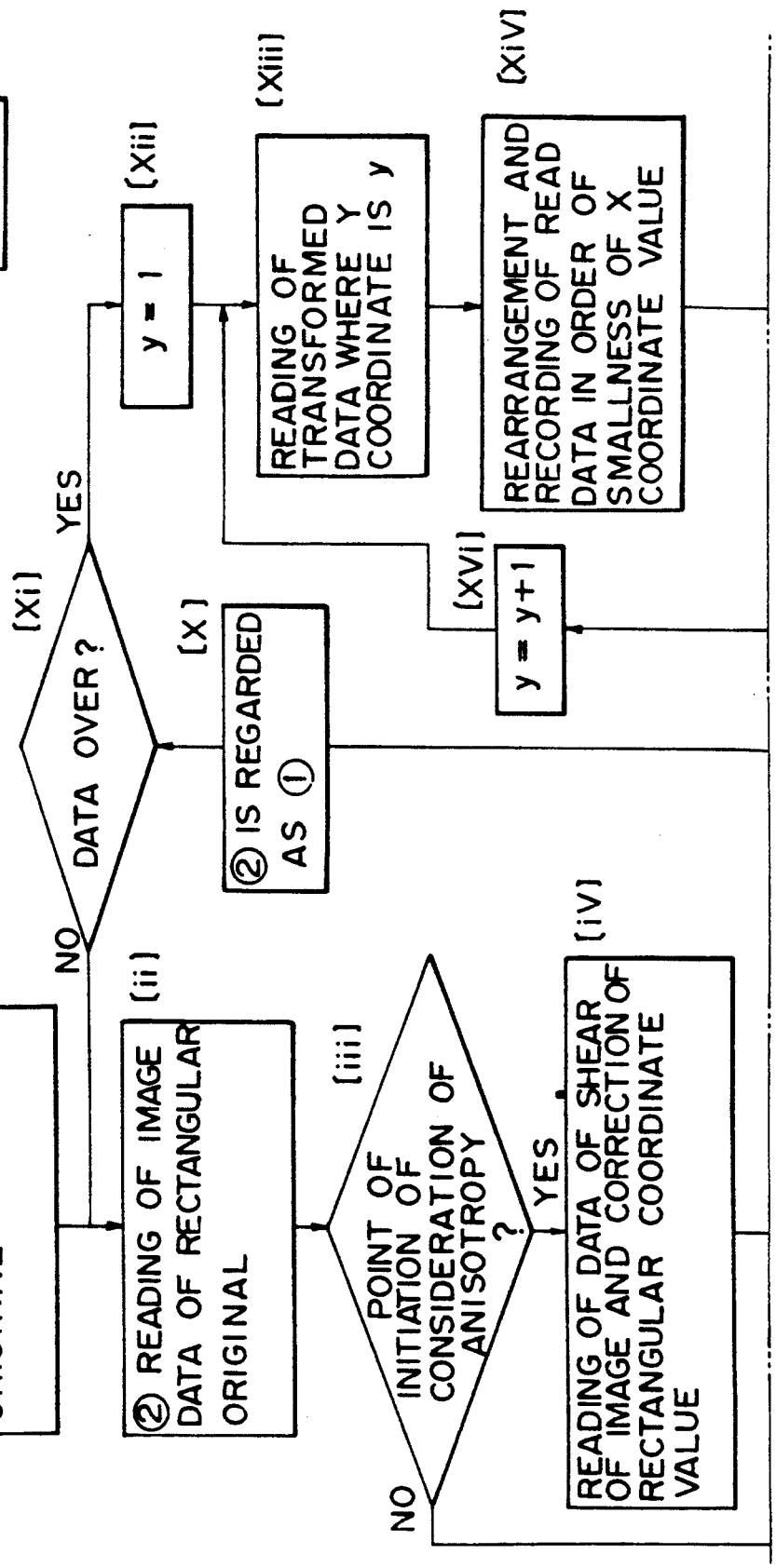

Fig. 20
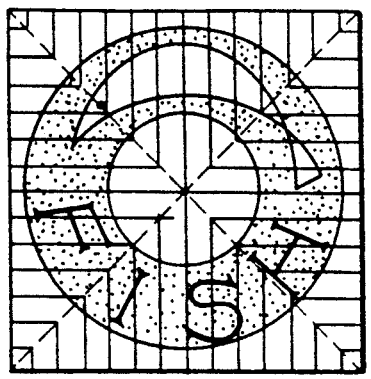
CYAN PRINTER: 90°
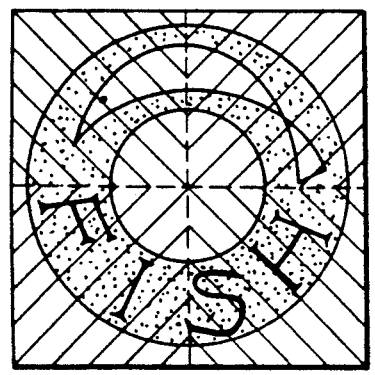
MAGENTA PRINTER: 45°
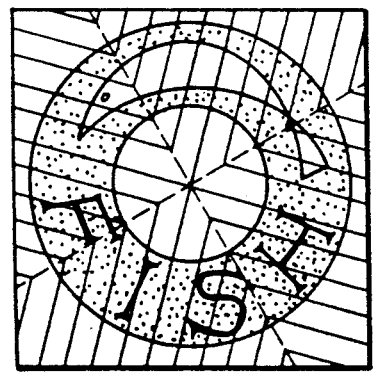
YELLOW PRINTER: 75°
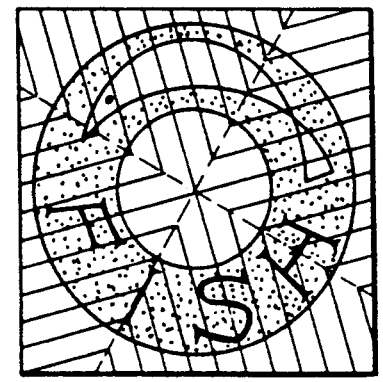
BLACK PRINTER: 15°

PROCESS FOR THE PREPARATION OF A DRAW-FORMED PRINTED CAN

TECHNICAL FIELD

The present invention relates to a draw-formed printed can and a process for the preparation thereof. More particularly, the present invention relates to a printed can obtained by draw-forming or draw-redraw-forming a preliminarily printed metal blank, in which formation of a striped pattern in the side wall portion of the can be prevented and further relates to an original print image can be faithfully reproduced, and a process for the preparation of this printed can.

Furthermore, the present invention relates to process in which formation of a printing plate from a printing original is carried out by a computer image processing. Moreover the present invention relates to a draw-formed printed can in which a print image having excellent linearity is displayed on the formed can without any error in due consideration of the anisotropy of the plastic flow of the metal blank, and a process for the preparation of this draw-formed printed can.

TECHNICAL BACKGROUND

Draw-forming of a surface-treated steel sheet such as a tinplate or tin-free steel sheet or a metal sheet such as an aluminum sheet is widely adopted for the manufacture of a so-called seamless can (two-piece can) and a metal cap. Coating or printing of individual formed bodies after the forming operation requires a complicated operation, and therefore, coating or printing of a flat blank before the draw-forming is desirable.

In draw-forming, a flat metal blank undergoes the plastic flow and is formed into a cup-shaped body. When the plastic flow of the portion of the flat blank, that will constitute the circumferential side wall portion of the formed body, is taken into consideration, it is confirmed that in this portion, elongation is caused in the direction corresponding to the height direction of the formed body.

In the preliminary printing of a flat blank for draw-forming, in view of the above-mentioned plastic flow of the blank, it is necessary that an original which is rectangular in the developed state should be converted to an annular printing plate. As means for effecting this conversion, there are known a hand-writing method, an optical conversion method and a digital conversion method proposed by us (Japanese Unexamined Patent Publication No. 61-267763 and Japanese Unexamined Patent Publication No. 61-267053).

However, in a can obtained by draw-forming a preliminarily printed metal blank, a striped pattern not found in the original print image is often formed at the upper part of the side wall portion, and this is especially conspicuous in a deep-draw-formed can or a can in which the thickness of the side wall portion is reduced by bending-rebending deformation.

As the result of the research made by us, it was found that in the draw forming of a preliminarily printed metal print, at the upper part of the side wall portion, dots become continuous owing to the compression flow of the blank in the circumferential direction and spaces between dots in the height direction increase owing to the elongation flow of the blank in the height direction, and this deformation of the dots tends to result in formation of a striped pattern.

Furthermore, the above-mentioned prior art techniques are defective in that the object is limited to an ordinary draw-formed can.

In the draw-redraw forming of a covered metal sheet, there is known a method in which the metal sheet is draw-formed into a deep-draw-formed cup by a curvature corner portion of a redrawing die and the side wall portion is subjected to the bending-rebending deformation to reduce the thickness. However, in the production of this thickness-reduced draw-formed can, there is not known a method in which the metal blank used is preliminarily printed and a print image faithful to the original image is manifested.

According to the above-mentioned hand-writing method, a rectangular transparent original ruled in squares is wound around the circumferential side wall portion of the draw-formed body, areas corresponding to the original image are painted by hand writing on the annular developed plane having squares correspondig to those of the ruled original to prepare a printing plate for a sheet-shaped blank. However, a high skill is necessary for the preparation of this printing plate and a large cost and a long time are required. Moreover, the print image practically reproduced on the circumferential side wall portion of the draw-formed body is still insufficient in the precision and the like.

The technique of forming a printing plate by optically developing a rectangular original annularly has already been proposed. For example, Japanese Examined Patent Publication No. 45-11388 discloses a method in which a rectangular original is photographed so that the height direction is shortened, the obtained photo is wound around a mandrel and the photo is photographed again through a frustoconical mirror arranged around the mandrel to obtain a printing plate having an annularly developed image, and Japanese Examined Patent Publication No. 48-23455 discloses a method in which a frustoconical prism having at the center a hole having an inner diameter almost equal to the outer diameter of the can is arranged, a rectangular original is located on the inner surface of the hole and this original image is photographed by a camera through the above-mentioned prism and a correcting lens to form a plate having an annular plane.

In these methods, however, troublesome operations and particular optical devices are necessary, and because of the abberation or the like of the optical system, it is difficult to reproduce a fine dot pattern at a high precision. Moreover, every time the original for the draw-formed body is changed, the troublesome conversion operation should be carried out for forming a plate.

In each of metal blanks for cans, the thickness is reduced by a high rolling operation, and an anisotropy is produced in the plastic flow of the blank at the draw-forming by an influence of this rolling. Accordingly, turbulence of a print image is readily caused in the side wall portion of the obtained draw-formed can, especially at the upper part of the side wall portion, and the precision or linearity of the image is often degraded.

DISCLOSURE OF THE INVENTION

It is an object of the present invention to provide a process in which in not only draw-forming but also deep-draw-forming or thickness-reducing draw-forming of a preliminarily printed metal blank, formation of an undesired striped pattern in the side wall portion is effectively prevented and a print image corresponding precisely to an image of a rectangular original is formed.

Another object of the present invention is to provide a process in which an image of a rectangular original is formed on an annularly developed plane of a printing plate is due consideration of the fact that the side wall portion is elongated in the height direction at the draw-redraw forming and further in due consideration of the anisotropic flow of the metal blank, and even if the thickness is reduced, a thickness-reduced draw-formed printed can on which a print image faithful to the original is formed can be prepared.

Still another object of the present invention is to provide a thickness-reduced draw-formed printed can in which high-degree drawing and high-degree thickness reduction of the side wall portion are accomplished though the can is obtained by the draw-redraw forming of a preliminarily printed metal blank, and the shear is controlled to a very low level even at the upper part of the side wall portion where the degree of deformation of the print image is high.

A further object of the present invention is to provide a process for the preparation of a draw-formed body in which an image of a rectangular original can be reproduced finely and precisely in units of dots or picture elements on a printing plate having an annularly developed plane, and a print image corresponding precisely to the image of the rectangular original can be formed on a circumferential side wall portion of the draw-formed body.

A still further object of the present invention is to provide a process for preliminarily printing a blank to be draw-formed, in which formation of an annularly developed flat printing plate from a rectangular printing original is performed by a digital computer image processing.

A still further object of the present invention is to provide a process for preliminary printing a blank to be draw-formed, in which for draw-formed vessels or caps having the same size, a certain memory is utilized irrespectively of a change of the original design, and the above-mentioned digital image processing can be performed simply at a high speed.

A still further object of the present invention is to provide a process for the preparation of a plate for preliminarily printing a blank to be draw-formed, in which the above-mentioned conversion processing can be promptly performed by a computer having a relatively small capacity.

A still further object of the present invention is to provide a draw-formed printed can in which a print image having a good precision and a good linearity by the preliminary printing can be manifested on the outer surface of the side wall of the can irrespectively of the plastic flow by rolling of the laminate.

In accordance with the present invention, there is provided a process for the preparation of a thickness-reduced, draw-formed printed can having a print image on a side wall portion thereof, which comprises draw-forming a preliminarily printed metal blank, wherein in due consideration of the fact that the side wall portion is elongated in the height direction by the draw-redraw forming, a rectangular original to be printed is subjected to such a digital image processing as diminishing an image of the original in the height direction, simultaneously with or subsequently to the digital image processing, the diminished original image is subjected to an image processing for developing the diminished original image in an annular plane having the substantially same area as that of the rectangular shape of the diminished original image to form a printing plate, the metal blank is printed by using the so-formed printing plate, the printed metal blank is formed into a preliminarily drawn cup, and bending-rebending deformation is caused in the preliminarily drawn cup by using a redrawing die having a small curvature to reduce the thickness of the side wall portion.

Furthermore, in accordance with the present invention, there is provided a process for the preparation of a thickness-reduced, draw-formed printed can having a print image on a side wall portion thereof, which comprises draw-forming a preliminarily printed metal blank, wherein in due consideration of the fact that the side wall portion is elongated in the height direction by the draw-redraw forming, a rectangular original to be printed is subjected to such a digital image processing as diminishing an image of the original in the height direction, simultaneously with or subsequently to the digital image processing, the diminished original image is subjected to an image processing for developing the diminished original image in an annular plane having the substantially same area as that of the rectangular shape of the diminished original image and being corrected by the anisotropy of the elongation of the metal blank to form a printing plate, the metal blank is printed by using the so-formed printing plate, the printed metal blank is formed into a preliminarily drawn cup, and bending-rebending deformation is caused in the preliminarily drawn cup by using a redrawing die having a small curvature to reduce the thickness of the side wall portion.

Moreover, in accordance with the present invention, there is provided a thickness-reduced, draw-formed printed can prepared by draw-forming a preliminarily printed metal blank and having a print image manifested at least on an outer surface of a side wall portion, wherein the draw-formed printed can is formed by subjecting the preliminarily printed metal blank to draw-redraw forming and reducing the thickness of the side wall portion by bending-rebending deformation at the redraw forming, the draw-formed printed can has a can height/can diameter ratio (H/D) of from 1.0 to 4.0 and a side wall thickness/bottom thickness ratio (Tw/Ts) of from 0.4 to 1.0, and the quantities of the shears in the axial direction and circumferential direction at the upper part of the print image on the side wall portion are smaller than 3.0% and smaller than 2.0%, respectively.

Still further, in accordance with the present invention, there is provided a process for the preparation of a draw-formed printed can having a print image at least on a side wall portion, which comprises draw-forming a preliminarily printed metal blank, wherein an image of a rectangular original to be printed is developed in an annular plane, at least a circumferential portion of the annular image is divided into a plurality of regions, a printing plate which is halftone-separated so that universal lines or longitudinal directions of long dots in the respective regions are oriented substantially to the center of the annular plane is formed, and the metal blank is printed by using the so-formed printing plate. In this process, the image of the rectangular original to be printed is developed in an annular plane by known means, and a halftone-separated printing plate is formed from this annular image. Preferably, the formation of this printing plate is performed by multiple light exposure where the screen angle is changed for each of the divided regions, and a universal line screen or a long dot screen is preferably used as the halftone-separating screen.

Still further, in accordance with the present invention, there is provided a process for the preparation of a printed draw-formed body having a print image formed on a side wall portion thereof, which comprises draw-forming a preliminarily printed blank, wherein an image of an original to be printed is converted to a digital picture element signal on a rectangular coordinate, the picture element signal on the rectangular coordinate is transformed to a picture element signal or a group of picture element signals on a transformation coordinate used when the rectangular coordinate is developed in an annular plane having an area almost equal to or a little smaller than the area of the rectangular shape of the rectangular coordinate, in correspondence to the transformation coordinate, the image signals on the transformation coordinate are read in order of the coordinate and transformed to a blank-printing plate, a synthetic resin film is printed by using the printing plate, and the printed synthetic resin film is laminated on the metal blank.

Still further, in accordance with the present invention, there is provided a process for preparing a draw-formed body having a print image formed on a side wall portion thereof by draw-forming a preliminarily printed metal lank, which comprises converting an image of an original to be printed to a picture element signal on a corresponding digital rectangular coordinate, subjecting the rectangular coordinate to digital coordinate transformation to an annular plane having an area almost equal to or a little smaller than the area of the rectangular shape of the rectangular coordinate, calculating a new coordinate of a picture element present in a space between the transformation coordinates corresponding to adjacent picture elements on the rectangular coordinate, substituting the picture element signal on he digital rectangular coordinate for the transformation coordinate and new coordinate, reading the picture element signals on the transformation coordinates in order of the coordinate, electro-optically converting the read picture element signals to a printing plate, printing a synthetic resin film by using the printing plate, and laminating the printed synthetic resin film on the metal blank.

In accordance with a preferred embodiment of the present invention, there is provided a process for the preparation of a draw-formed printed can, which comprises converting an image of an original to be printed to a digital picture element signal on a rectangular coordinate, developing the rectangular coordinate in an annular plane having an area almost equal to or a little smaller than the area of the rectangular shape of the rectangular coordinate, converting the picture element signal on the rectangular coordinate to a picture element signal or a group of picture element signals on a transformation coordinate formed by correcting the annular plane in due consideration of the anisotropy of the elongation of the metal blank in correspondence to the transformation coordinate, reading the picture element signals on the transformation coordinate in order of the coordinate to form a blank-printing plate, printing a synthetic resin film by using the printing plate, and laminating the printed synthetic resin film on the metal blank.

Still further, in accordance with the present invention, there is provided a process for preparing a draw-formed printed can having a print image formed on a side wall portion by draw-forming a preliminarily printed metal blank, which comprises converting an image of an original to be printed to a picture element signal on a corresponding digital rectangular coordinate, subjecting the rectangular coordinate to digital coordinate transformation to an annular plane having an area almost equal to or a little smaller than the area of the rectangular shape of the rectangular coordinate and being corrected in due consideration of the anisotropy of the elongation of the metal blank, calculating a new coordinate of the picture element present in the space between the transformation coordinates corresponding to the adjacent picture elements of the rectangular coordinate, substituting the picture element signal on the digital rectangular coordinate for the corresponding transformation coordinate and new coordinate, reading the picture element signals on the transformation coordinate in order of the coordinate to electro-optically convert the picture element signals to a printing plate, printing a synthetic resin film by using the so-formed printing plate, and laminating the printed synthetic resin film on the metal blank.

Still further, in accordance with the present invention, there is provided a draw-formed printed can obtained by draw-forming a laminate of a preliminarily printed synthetic resin film and a metal blank and manifesting a print image at least on an outer surface of side wall portion, wherein the linearity in the circumferential direction of the print image at the upper part of the side wall portion is maintained so that the shear between the rolling direction and the direction crossing the rolling direction at 45° is within 1% of the height of the side wall portion, and the linearity in the axial direction of the print image is maintained so that the shear at a position separate by about 22° from the rolling direction is within 1% of the length of the outer circumference of the side wall portion.

BRIEF DESCRIPTION OF THE DRAWINGS

FIGS. 1-A and 1-B are diagrams illustrating the prevention of formation of a striped pattern.

FIGS. 2-A and 2-B are diagrams illustrating the formation of a striped pattern.

FIGS. 3-A through 3-C are diagrams illustrating the principle of forming a printing plate.

FIGS. 4-A and 4-B are perspective views illustrating a printed draw-formed body.

FIGS. 5-A and 5-B are diagrams illustrating in the developed state the circumferential side wall portion of the printed draw-formed body shown in FIGS. 4-A and 4-B.

FIGS. 6-A through 6-C and 7-A 7-C are diagrams illustrating the steps of preparing the printed draw-formed body shown in FIGS. 4-A and 5-A.

FIGS. 10-A and 10-B are diagram illustrating the processing of diminishing the rectangular coordinate.

FIGS. 11-A and 11-B are diagrams illustrating the coordination transformation of the rectangular coordinate to the annular coordinate.

FIGS. 14, 14A and 14B show a flow chart illustrating the coordinate transformation operation and the operation of changing the rectangular coordinate to the transformation coordinate according to a second embodiment of the present invention.

FIG. 16 is a diagram illustrating the step of forming a correspondence table for transformation of the rectangular coordinate to the annular coordinate.

FIGS. 17, 17A and 17B show a flow chart illustrating the step of transforming the coordinates in due consideration of the anisotropy of the plastic flow.

FIGS. 18 and 18A-18C show a flow chart illustrating the step of transforming the coordinate and reading picture element signals from the transformation coordinate in due consideration of the anisotropy of the plastic flow.

FIG. 20 is a diagram illustrating examples of screen angles of respective color plates of a multicolor image-printing plate.

PREFERRED EMBODIMENTS OF THE INVENTION

Figure 8:
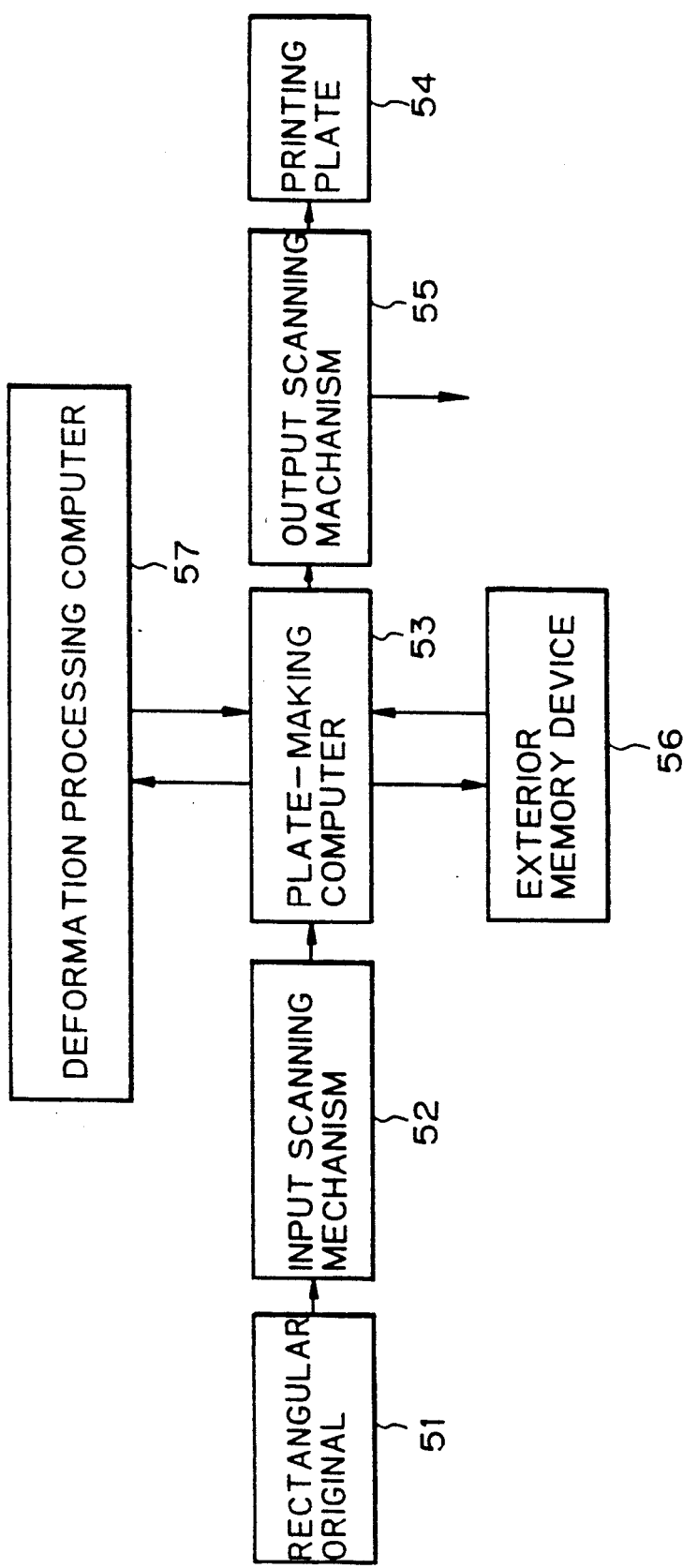
FIG. 8 is a block diagram illustrating the image processing step.

According to the present invention, in due consideration of deformation at the draw-forming step, an image of an original to be printed is developed into an annular plane according to known means and a halftone-separated printing plate is formed from this annular image, and the present invention is characterized in that at least the outer circumferential portion of this annular image is divided into a plurality of regions and is halftone-separated so that universal lines or long dots are oriented substantially to the center of the annular plane.

Referring to FIGS. 2-A and 2-B illustrating formation of a striped pattern at the upper part of the side wall portion, FIG. 2-A is an enlarged view (100 magnifications) of a print image of a blank 1 before the draw-forming processing, and FIG. 2-B is an enlarged view (100 magnifications) of a print image at the upper part 2 of the side wall portion after the draw-forming processing. In the blank 1 before the draw-forming processing, dots 4 are regularly arranged at certain pitches P in a white background 3 in either the longitudinal direction (height direction) or the lateral direction (radial direction). The pitch P is smaller than the space that can be distinguished by the naked eye. In contrast, at the upper part 2 of the side wall portion after the processing, the substantially square dots 4 are deformed to long rhombic dots 4a according to the elongation flow in the height direction and the contraction flow in the circumferential direction at the draw-forming processing or the thickness-reducing draw-forming processing, and the pitch in the height direction is increased to PH and the pitch in the circumferential direction is contracted to pC. Since the pitch of the dots in the circumferential direction is contracted to PC and the dots are substantially contiguous to one another and also since the pitch of dots in the height direction is expanded to PH that can be distinguished by the naked eye, the arrangement of the dots in FIG. 2-B is discriminated as a striped pattern.

Referring to FIGS. 1-A and 1-B illustrating the prevention of formation of a striped pattern in the present invention, FIG. 1-A is an enlarged view (same magnifications as described above) of a print image of a blank 1 before the draw-forming processing and FIG. 1-B is an enlarged view of a print image at the upper part 2 of the side wall portion after the draw-forming processing. In the blank 1 before the draw-forming processing, universal lines 5 are regularly arranged at certain pitches P in the lateral direction so that the height direction is the longitudinal direction. At the upper part 2 of the side wall portion of the can obtained by draw-forming this blank, the universal lines 5 are converted to thin universal lines 5a according to the above-mentioned plastic flow at the draw-forming step, and the pitch P is diminished to PM in the circumferential direction. Accordingly, the formation of a striped pattern can be prevented.

In the present invention, the formation of a striped pattern can be prevented by arranging universal lines as the picture elements substantially in the radial direction, that is, so that the universal lines are oriented to the center (in the height direction of the can) of the annular plane, at least in the regions of the circumferential portion of the annular plane. A similar effect is attained by using long dots as the picture elements instead of the universal lines and arranging them so that the longitudinal directions of the dot lines are oriented in the above-mentioned manner.

Referring to FIGS. 3-A through 3-C illustrating the principle of forming a printing plate of the present invention, an original plate 6 for printing is divided into a plurality of portions of the same angle by lines passing through the center N, four portions A1, A2, B1 and B2 in the present embodiment. At the first step of FIG. 3-A, the regions B1 and B2 point-symmetric with each other are masked with a light-shielding material 7 and the regions A1 and A2 point-symmetric with each other are covered with a screen 8 in such a positional relationship that the universal lines 5 pass through the center N. In this state, the light exposure is carried out with the annular image and a halftone-separated image or latent image is formed in A1 and A2. Then, at the second step shown in FIG. 3-B, the exposed regions A1 and A2 are masked with the light-shielding material 7 and the unexposed regions B1 and B2 point-symmetric with each other are covered with the screen 8 in such a positional relationship that the universal lines 5 passes through the center N, and in this state, the light exposure is carried out with the annular image to form a halftone-separated image or latent image in B1 and B2. This divided multiple light exposure is carried out a necessary number of times for the respective divided regions or point-symmetric regions. Referring to FIG. 3-C showing final printing plate 9, there is obtained a halftone-separated printing plate 9 which is divided into a plurality of regions A1, B1, A2 and B2 and in which the longitudinal directions of the universal lines 5 in each of these regions are substantially oriented to the center N of the annular plane. Accordingly, by printing a blank by using this printing plate 9, formation of an undesirable striped pattern is prevented and a draw-formed printed can in which the print image is faithfully reproduced is obtained. It will be obvious to those skilled in the art that in the present invention, a method in which only the circumferential portion where the degree of formation of a striped pattern is extremely high is divided can be adopted instead of the method in which the entire annular plane is divided.

FIGS. 4-A and 4-B showing a printed can obtained by ordinary draw-forming or thickness-reducing draw-forming (hereinafter inclusively referred to as "draw-formed printed can"), this printed can 11 comprises a bottom 12 and a circumferential side wall portion 13 seamlessly integrated with the bottom 12. In the printed can obtained by thickness-reducing draw-forming, which is shown in FIG. 4-B, the circumferential side wall portion 13 is highly drawn and the ratio (H/D) of the can height (H) to the can diameter (D) is generally from 1.0 to 4.0 and especially from 1.0 to 3.0. Furthermore, the side wall portion 13 is elongated and the thickness is reduced, and the ratio ($T_w/T_B$) of the thickness ($T_w$) of the side wall portion to the thickness ($T_B$) of the bottom portion is generally from 0.4 to 1.0 and especially from 0.6 to 1.0.

A print layer 14 is formed on the side wall portion 13 by preliminary printing. Referring to FIG. 5 illustrating the circumferential side wall portion 13 in the developed state, the print layer 14 has a rectangular shape having a length l and a height h, and the quantity of the shear at the upper part 15 of the print layer 14 based on the lower part is smaller than 3.0%, especially smaller than 2.5%, in the axial direciton and smaller than 2.0%, especially smaller than 1.5%, in the circumferential direction.

Referring to FIGS. 6-A through 7-B illustrating the steps of preparing a draw-formed printed can 11, at first, an annularly developed print layer 18 is applied to a flat coated or uncoated metal blank 16 by using a printing plate 17 (FIG. 6-A). This annular print layer 18 has an inner circumferential portion 19 almost equal to the length l of the rectangular print layer 14 and an outer circumferential portion 20 larger than the length l, and the difference m between the radius of the circumferential portion and the radius of the inner circumferential portion is smaller than the height h of the rectangular print layer 14 and the area of the annular print layer 18 is smaller than the area of the rectangular print layer 14. The degree of this contraction of the area corresponds to the degree of the thickness reduction of the side wall portion (described in detail hereinafter).

In the case where a synthetic resin film is first printed and is then laminated on a metal blank instead of the direct printing of the metal blank by the printing plate, as shown in FIG. 6-B, the annularly developed print layer 18 is applied to a sheet-like synthetic resin film 21a by using the printing plate 17. This annular print layer 18 has an inner circumferential portion 19 almost equal to the length l of the rectangular print layer 14 and an outer circumferential portion 20 larger than than the length l, the difference m between the radius of the outer circumferential portion and the radius of the inner circumferential portion is smaller than the height h of the rectangular print layer 14, and the annular print layer 18 has an area almost equal to or a little smaller than that of the rectangular print layer 14.

When the synthetic resin film 21a is printed, an inverse image may be printed on the inner surface side of the resin film, that is, the surface confronting the metal blank on the lamination, or a normal image is printed on the outer surface side of the resin film, that is, the surface not confronting the metal blank on the lamination.

The printed synthetic resin film 21b is laminated on the metal blank 16 to form the above-mentioned structure (FIG. 6-C). In the case where the printed surface is exposed, a protecting layer can be formed according to need. In the embodiment shown in FIG. 6-C, the printed surface 21c is located on the side of the metal blank.

The printed metal blank 16 or laminate 21 is punched into a circular blank 32 by using a shearing die 30 and a shearing punch 31 at the shearing step shown in FIG. 7-A. Then, at the draw-forming step shown in FIG. 7-B, the circular blank 32 is gripped between a drawing die 33 having a diameter corresponding to the outer diameter of the formed body and a blank holder 34, and a drawing punch 35 having an outer diameter corresponding to the inner diameter of the formed body is pressed into the circular blank 32 to form a draw-formed body 11 shown in FIG. 4-A.

In the thickness-reduced draw-formed printed can, the redrawing step shown in FIG. 7-C is added to the above-mentioned operations. At this redrawing step, a preliminarily drawn cup 36 is held by an annular holding member 37 inserted into this cup and a redrawing die 38 located below the holding member 37, and a redrawing punch 39, which is arranged so that the punch 39 comes into the holding member 37 and comes out therefrom, is pressed into the redrawing die 38. The preliminarily drawn cup 36 passes through a horizontal plane defined by an annular bottle surface 40 of the annular holding member 37 and a top surface of the redrawing die 38 and is bent substantially vertically to the axial direction by an acting corner portion 42, having a small curvature, of the redrawing die 38, whereby the cup is deeply drawn to form a final formed body and simultaneously, the thickness of the side wall portion is reduced by bending deformation and rebending deformation.

In general, if the curvature radius (Rd) of the acting corner portion of the redrawing die is 1 to 2.9 times, especially 1.5 to 2.9 times, the thickness ($T_B$) of the preliminarily printed metal blank, the reduction of the thickness of the side wll portion by bending and elongation is effectively accomplished, and the variation of the thickness between the upper and lower parts of the side wall portion is eliminated and the thickness is uniformly reduced over the entire side wall portion.

Referring to FIG. 7-C illustrating the bending elongation step, a preliminarily printed metal sheet 36a is forcibly bent along an acting corner portion 42 of a redrawing die having a curvature radius R under a sufficient back tension. In this case, no distortion is caused on the surface of the metal blank 36a on the side of the acting corner, but the metal blank undergoes distortion by pulling on the surface on the side opposite to the acting corner portion. This distortion quantity $\epsilon s$ is given by the following formula:

$$\epsilon s = \frac{2(Rd + t) - 2Rd}{2Rd} = \frac{t}{Rd} \tag{1}$$

wherein Rd represents the curvature radius of the acting corner portion and t represents the sheet thickness.

The surface (inner surface) of the metal sheet is elongated by $\epsilon s$ by the acting corner portion, but the other surface (outer surface) is elongated by the same quantity as $\epsilon s$ by the back tension just below the acting corner portion. By this bending elongation, the thickness of the coated metal sheet is reduced, and the thickness change ratio $\epsilon t$ is given by the following formula:

$$\epsilon t = \frac{-t}{Rd + t} \tag{2}$$

From this formula (2), it is understood that decrease of the curvature radius Rd of the acting corner portion is effective for reducing the coated metal sheet, that is, the smaller is Rd, the larger is the change $|\epsilon t|$ of the thickness. Furthermore, it is understood that supposing that the curvature Rd of the acting corner portion is constant, the larger is the thickness t of the coated metal sheet passing through the acting corner portion, the larger is the change $|\epsilon t|$ of the thickness.

According to the present invention, a printing plate having an annularly developed print image is prepared from a rectangular printing original as shown in FIGS. 5-A and 5-8 by the digital image processing described in detail hereinafter.

Referring to the block diagram of FIG. 8 illustrating this image processing, the apparatus used for this processing comprises, in principle, an input scanning mechanism 52 for converting an image of a rectangular original 51, a known plate-forming computer 53 for receiving a picture element signal formed by analog/digital conversion of a picture element signal, performing an editing operation such as correction, clipping, designation of the position, trimming or synthesizing based on this digital picture element signal if necessary and digital/analog-converting and putting out the digital picture element signal, an output scanning mechanism 55 for forming a printing plate or block copy 54 based on an electrical signal from the computer 53, a recording material 56 for storing the date of the plate-forming computer 53, and a deformation processing computer 57 for performing the coordinate transformation of the digital picture element signal from the rectangular coordinate to an annular coordinate having the same area as that of the rectangular coordinate, or contracting the image of the original in the height direction according to the elongation (reduction of the thickness) at the drawforming step and performing the coordinate transformation of the contracted digital picture element signal from a contracted rectangular coordinate to an annular coordinate having the same area (the annular coordinate may be corrected in due consideration of the anisotropy of elongation of the laminate), and putting out the picture element signal on the transformed coordinate to the plate-forming computer 53.

(First Embodiment)

According to the present invention, the digital picture element signal on the rectangular coordinate put into the plate-forming computer 53 is recorded as a picture element signal or a group of picture element signals on the transformed coordinate by the deformation processing computer 57 in correspondence to the transformed coordinate formed by developing the rectangular coordinate into an annular plane having an area almost equal to or a little smaller than the area of the rectangular shape of the rectangular coordinate, and picture element signals on the transformed coordinate are read in order of the coordinate.

This processing is generally accomplished through (i) formation of a correspondence table between the rectangular coordinate and the annular transformed coordinate and (ii) rewriting of the rectangular coordinate to the transformed coordinate based on the correspondence table.

Figure 9:
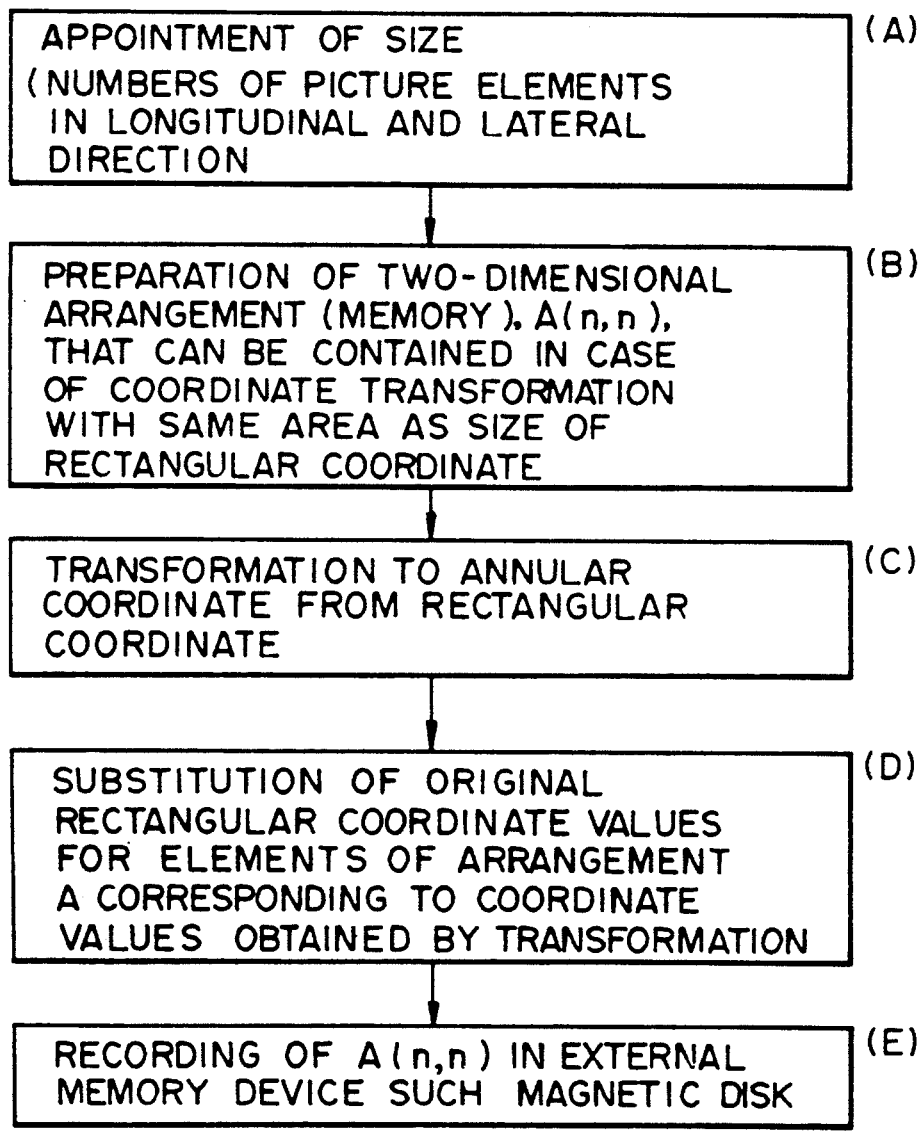
FIG. 9 is a diagram illustrating the step of forming a correspondence table for transformation of the rectangular coordinate to the annular coordinate.

Referring to FIG. 9 illustrating the step (i) of forming the correspondence table, the size of the rectangular coordinate, the numbers of picture elements in the longitudinal and lateral directions, is appointed at step (A). In the case where the rectangular coordinate is transformed to an annular coordinate having an area a little smaller than the area of the rectangular coordinate, the rectangular coordinate should be subjected to a contraction processing in advance.

Referring to FIGS. 10-A and 10-B illustrating this contraction processing, the original rectangular coordinate a, b (FIG. 10-A) and the corresponding contracted rectangular coordinate a', b' (FIG. 10-B) are determined so that the requirement represented by the following formulae:

$$a' = \frac{l}{lo} a \tag{3}$$

$$b' = b \tag{4}$$

wherein a' and b' are integer values rounded by counting fractions of 5 and over as a unit and disregarding the rest, lo represents the height of the original rectangular coordinate and l represents the height of the contracted rectangular coordinate, is satisfied. Among the area So of the octangular rectangular coordinate, the area S of the contracted coordinate, the thickness Tb of the bottom of the final can body and the average thickness Tw of the side wall portion, the following relation is established:

$$\frac{l}{lo} = \frac{S}{S_o} = \frac{Tw}{Tb} \tag{5}$$

The value of the contraction ratio can be easily decided according to this relation. The contraction processing can be accomplished by eliminating the line (lo−1) of the picture element on the average.

Then, at step (B), a two-dimensional arrangement (memory) A (n,n) having a size sufficient to contain the coordinate formed by transforming the rectangular coordinate to the annular coordinate having an area almost equal to or a little smaller than the area of the rectangular coordinate is prepared. At step (C), the rectangular coordinate or the contracted rectangular coordinate (often hereinafter collectively referred to as the rectangular coordinate) is transformed to the annular plane. Referring to FIGS. 11-A and 11-B illustrating this coordinate transformation, the rectangular coordinate a,b (FIG. 11-A) and the corresponding transformed coordinate a',b' (FIG. 11-B) are determined so that the requirements represented by the following formulae are satisfied:

$$a' = r \sin \theta + O \tag{6}$$

$$b' = r \cos \theta + O \tag{7}$$

wherein a' and b' are integer values rounded by counting fractions of 5 and over as a unit and disregarding the rest, and the radius r, angle $\theta$ and center O shown in FIG. 11-A are represented by the following formulae, respectively:

$$r = \sqrt{\frac{m}{\pi}\left(a + \frac{m}{4\pi}\right)} \tag{8}$$

-continued $$\theta = \frac{2\pi b}{m} \quad (9)$$

$$0 = \sqrt{\frac{m}{\pi}\left(I + \frac{m}{4\pi}\right)} \quad (10)$$

At this coordinate transformation, the influence of the plastic flow of the flat blank at the draw-forming should be taken into consideration. Namely, in the annular plane shown in FIG. 11-B, the contraction flow and the elongation flow are produced in the circumferential direction and the radial direction, respectively, at the draw-forming, and therefore, it is necessary to increase the number of picture elements in the circumferential direction and decrease the number of picture elements in the radial direction prior to the coordinate transformation.

Figure 12:
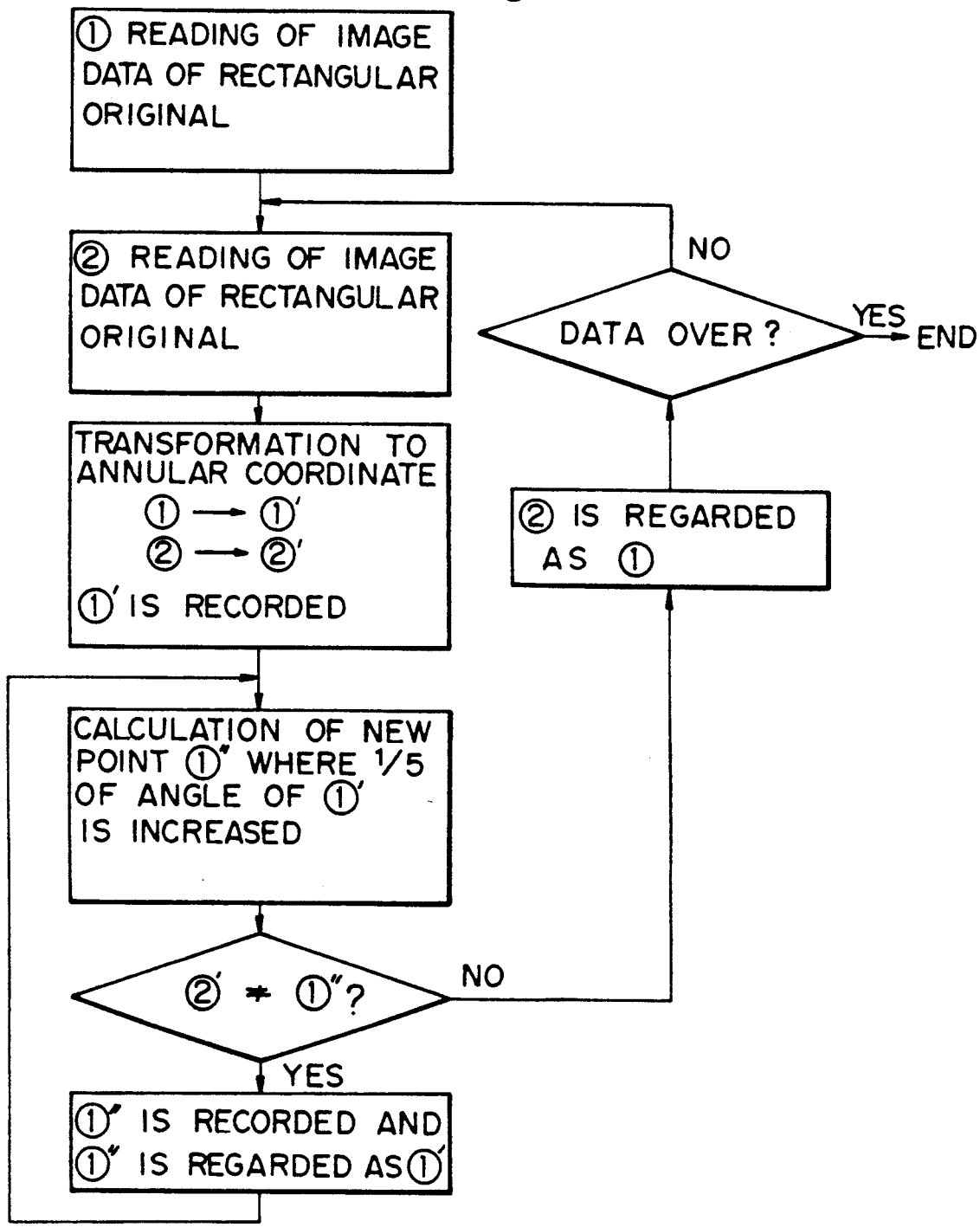
FIG. 12 is a flow chart illustrating the coordinate transformation operation.

This operation is conducted according to a flow chart shown in FIG. 12. More specifically, adjacent coordinate values (1) and (2) in the direction of the axis X of the rectangular coordinate are read, and the coordinate transformation of (1)→(1') and (2)→(2') is carried out by the same operation as described above and between (1) and (2), the angle is increased by one-severalth (for example, 1/5) of the angle of (1'), and the new coordinate value (1") and the new coordinate value (1") corresponding to this increase of the angle is calculated. In case of (2')≠(1"), (1") is regarded as (1') and new coordinate values corresponding to the above-mentioned increase of the angle are calculated. In case (2")=(1), (2) is regarded as (1) and the above operation is repeated. Thus, the correspondence between the coordinate value of the rectangular coordinate and a group of the coordinate value of the transformed coordinate is easily accomplished. The decrease of the coordinate value in the radial direction is easily accomplished by making a plurality of coordinate values of the rectangular coordinate correspond to one coordinate value of the transformed coordinate (data received afterward are stored).

Referring to FIG. 9 again, at step (D), the elements of the arrangement A corresponding to the coordinate values obtained by the transformation are substituted for the original rectangular coordinate values. Namely, in FIGS. 11-A and 11-B, when the transformation of a→a' and b→b' is performed, the substitution is effected in the form of (a', b')←a*ε+b (when b is number of p figures, ε is a number of 10$^p$).

The operations at steps (C) and (D) are carried out on all of the coordinate values of the rectangular coordinate.

Finally, the obtained two-dimensional arrangement A (n,n) is recorded in an external store device such as a magnetic disk to complete the formation of the correspondence table. In the present invention, if this correspondence table is once formed, for the same draw-formed body the correspondence table can be used repeatedly irrespectively of a change of the original or design.

Figure 13:
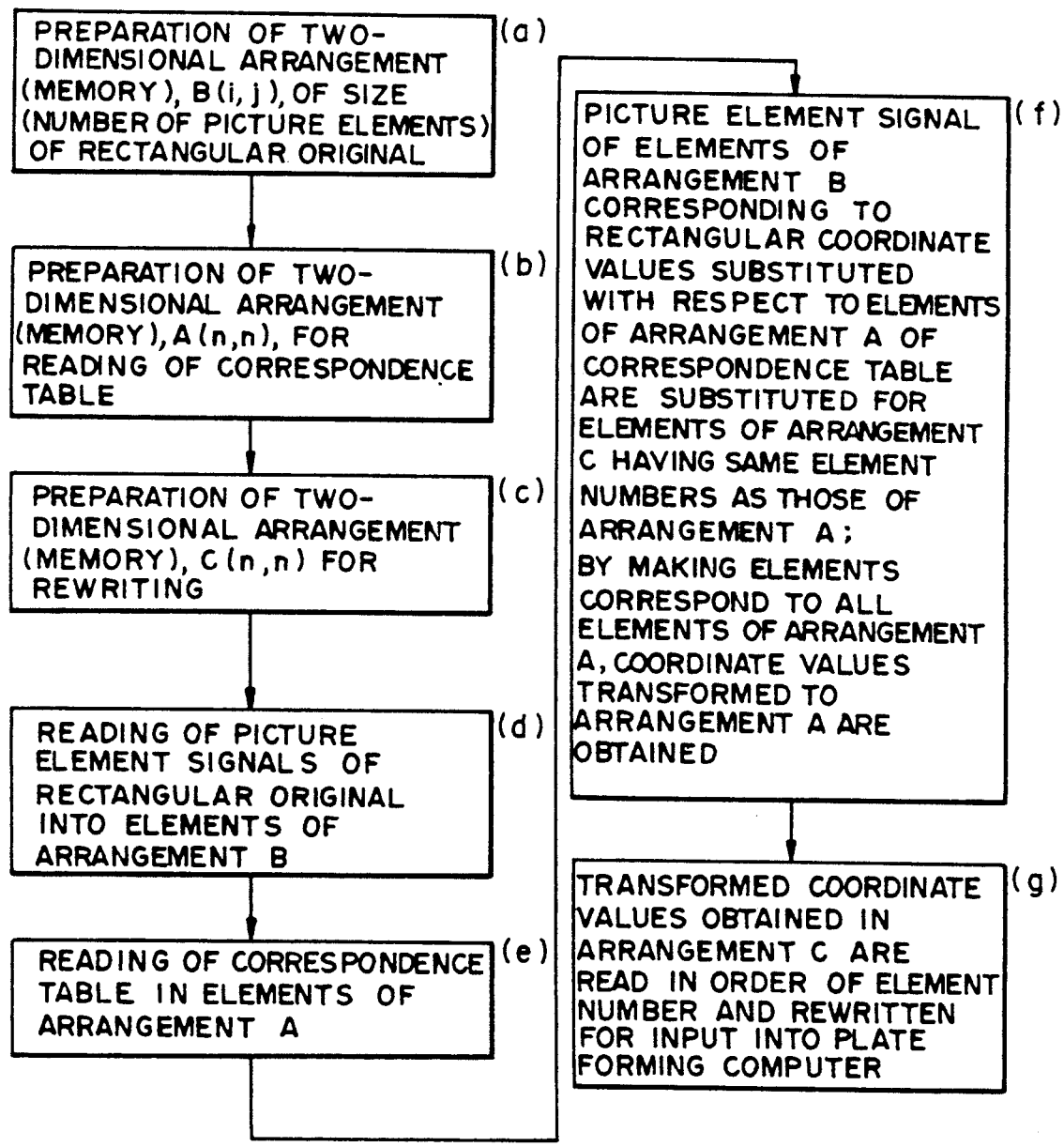
FIG. 13 is a flow chart illustrating the operation of changing the rectangular coordinate to the transformation coordinate.

Referring to FIG. 13 illustrating the operation (ii) of rewriting the rectangular coordinate to the transformed coordinate based on the so-formed correspondence table, at step (a) a two-dimensional arrangement (memory) 8 (i,j) of the size (the numbers of picture elements in the longitudinal and lateral directions) of the rectangular coordinate is prepared.

Then, at step (b), a two-dimensional arrangement (memory) A (n,n) for reading the above-mentioned correspondence table is prepared, and at step (c), a two-dimensional arrangement C (n,n) for the rewriting is prepared.

At step (d), the picture element signals of the rectangular original from the plate-forming computer are read in the respective elements of the arrangement B. At step (e), the correspondence table prepared and stored in advance is read in the respective elements of the arrangement A.

Then, at step (f), with respect to each of the respective elements of the arrangement A of the correspondence table, the picture element signals of the elements of the arrangement B corresponding to the substituted coordinate value of the rectangular coordinate are substituted for the elements of the arrangement C equal to the element numbers of the arrangement A. Namely, the rectangular coordinate substituted for the corresponding table A (a',b') is (a,b), as pointed out hereinbefore, but the image picture elements are substituted in the form of C (a',b')←B(a,b). At step (f), the transformed picture elements signals can be obtained by making the elements of the arrangement B correspond to all of the elements of the arrangement A.

Finally, at step (e), the transformed coordinate values obtained in the arrangement C are read in order of the coordinate to effect the rewriting for the input to the plate-forming computer 53.

According to the present invention, by the above-mentioned operations, the picture element signal [B(a,b)] on the rectangular coordinate is converted to the picture element signal or a group of the picture element signals [C(a',b')] on the transformed coordinate by making the rectangular coordinate correspond to the transformed coordinate formed by developing the rectangular coordinate into an annular plane having an area almost equal to or a little smaller than the area of the rectangular coordinate, and the picture element signals on the transformed coordinate can be read and put out in order of the coordinate.

The picture element signals on this transformed coordinate are fed to the output scanning mechanism 55 to form a printing plate or block copy.

According to the first embodiment of the present invention, by converting digital picture element signals of the above-mentioned rectangular original to picture element signals of the transformed coordinate by the coordinate transformation to an annular plane by the computer, influences of the camera photographing and development treatment on the image, such as fading of the image and changing of the concentration, can be prevented and the blank for the draw-forming can be preliminarily printed with excellent fidelity and reproducibility. Simultaneously, the number of steps and the processing time, required for formation of a printing plate, can be drastically reduced and shortened. Furthermore, the image deformation owing to the difference of the direction can be easily coped with at the draw-forming processing and the image quality can be easily improved. Moreover, if the correspondence table for the coordinate transformation is once formed, the correspondence table can be used for cans of the same kind repeatedly irrespectively of changes of the design and original, and the processing can be promptly accomplished.

(Second Embodiment)

According to the second embodiment of the present invention, picture element signals can be formed on the transformed coordinate directly from picture element signals on the rectangular coordinate without forming the above-mentioned correspondence table.

According to this embodiment of the present invention, by the deformation processing computer 57, the rectangular coordinate is subjected to the coordinate transformation to an annular plane having an area almost equal to or a little smaller than the area of the rectangular coordinate, new coordinate values of picture elements present in spaces of the transformed coordinate corresponding to adjacent picture elements of the rectangular coordinate are calculated, the picture element signals on the rectangular coordinate put in the plate-forming computer 53 are substituted for the corresponding transformed coordinate and bew coordinate, and the picture element signals on the transformed coordinate are read and put out in order of the ordinate.

Figure 14:
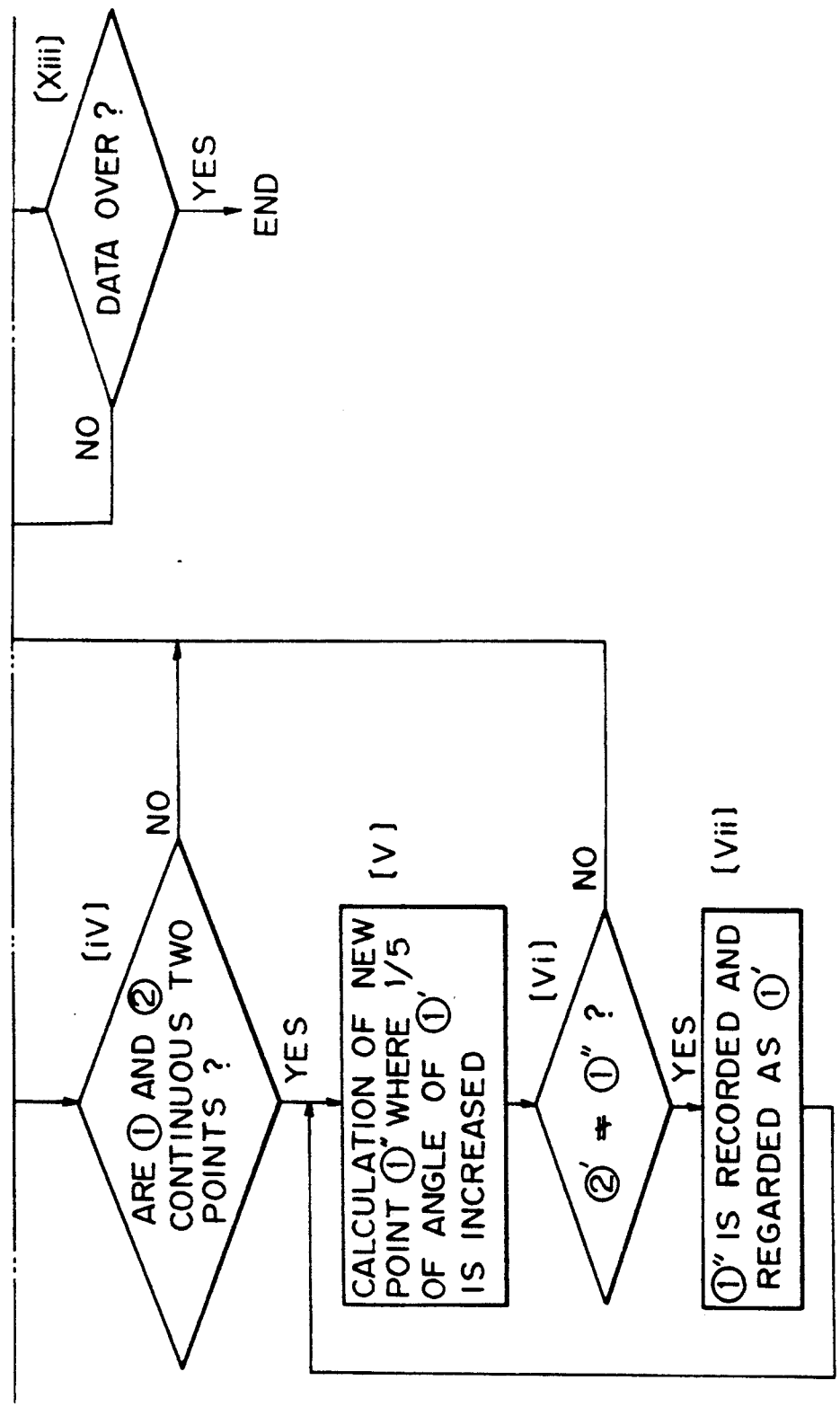

Referring to the flow chart of FIG. 14 illustrating this operation, at step (i), digital picture element signal data (1) are read the plate-forming computer 53, and at step (ii), data (2) adjacent to the data (1) in the direction of the axis X of the rectangular coordinate are read.

With respect to the data (1) and (2) read at steps (i) and (ii), between the rectangular coordinate and the transformed coordinate formed by transforming the rectangular coordinate to an annular plane having an area almost equal to or a little smaller than the area of the rectangular coordinate, the coordinate transformation of (1)→(1') and (2)→(2') is carried out and the data (1') are recorded.

The coordinate transformation at the step (iii) is carried out according to the procedures described hereinafter in the first embodiment with reference to FIGS. 10-A through 11-B.

Then, at step (iv), with respect to data (1) and (2) adjacent to each other in the direction of the axis X are compared, and it is judged whether or not they are two continuous color points. In the case where (1) and (2) are two continuous color points, at step (v), the angle is increased by one-severalth (for example, 1/5) of the angle of (1') between (1') and (2') according to the principle shown in FIGS. 11-A and 11-B, and the new coordinate value (1'') is calculated.

Then, at step (vi), the new coordinate value (1'') is compared with the transformed coordinate value (2'), and in case of (2')≠(1''), at step (vii), (1'') is recorded and the new coordinate (1'') is substituted for (1'), and at step (v), a new coordinate value corresponding to the new increase of the angle is calculated. Then, the operation is conducted similarly until (2') becomes equal to (1'').

When the new coordinate value (1'') becomes equal to (2') at step (vi), the data (2) of the rectangular coordinate is regarded as (1) at step (viii) and it is judged at step (ix) whether or not the reading of the data of the rectangular coordinate has been completed. If the reading has not been completed, new data (2) are read at step (ii) and the above-mentioned operation is repeated. Incidentally, in the above-mentioned operation is repeated. Incidentally, in the case where it is judged that data (1) and (2) are two continuous color points, (2) is regarded as (1) and the reading of subsequent data is carried out.

Thus, according to the second embodiment of the present invention, the correspondence of the rectangular coordinate values to the transformed coordinate values on the annular plane can be easily accomplished and also the calculation of new coordinate values of the picture element signals present in spaces between the two transformed coordinate positions obtained by the correspondence can be easily accomplished, and it becomes possible to perform the increase of data in the circumferential direction in advance by substituting the picture element signals on the rectangular coordinate for the transformed coordinate or further for the new coordinate. Furthermore, the decrease of the coordinate values in the radial direction can be easily accomplished by making a plurality of coordinate values of the rectangular coordinate correspond to one coordinate value of the transformed coordinate (data received afterward are stored).

Referring to FIG. 14, in the case where it is judged at step (ix) that reading of the data of the rectangular coordinate has been completed, at step (xi), the picture element coordinate value in the longitudinal direction is set at y=1, among the coordinate-transformed and recorded data, data where the value of the coordinate Y is y is read.

Then, at step (xii), the read data are arranged in order of the smallness of the coordinate X and recorded (sorted). At step (xiii), it is judged whether or not the recording of the coordinate-transformed data has been completed. In the case where the recording has not been completed, y is set at y 1 (y=y+1), and at step (xi), reading of data is carried out and the subsequent operations are conducted.

Thus, the coordinate-transformed data are put into the plate-forming computer 53 in order the recording.

According to the present invention, by the above-mentioned operations, a picture element signal on the rectangular coordinate can be converted to a picture element signal or a group of picture element signals on a transformed coordinate formed by developing the rectangular coordinate in an annular plane having an area almost equal to or a little smaller than the area of the rectangular coordinate, and furthermore, picture element signals on the transformed coordinate can be read out and put out in order of the coordinate.

The picture element signals on the transformed coordinate are fed to the output scanning mechanism 55 in order of the coordinate to form a printing plate or block copy.

According to this embodiment of the present invention, in addition to the above-mentioned advantages, there can be attained another advantage in that by carrying out the coordinate transformation in the above-mentioned manner, a printing plate can be formed promptly by using a computer having a relatively small capacity.

(Third Embodiment)

Figure 15:
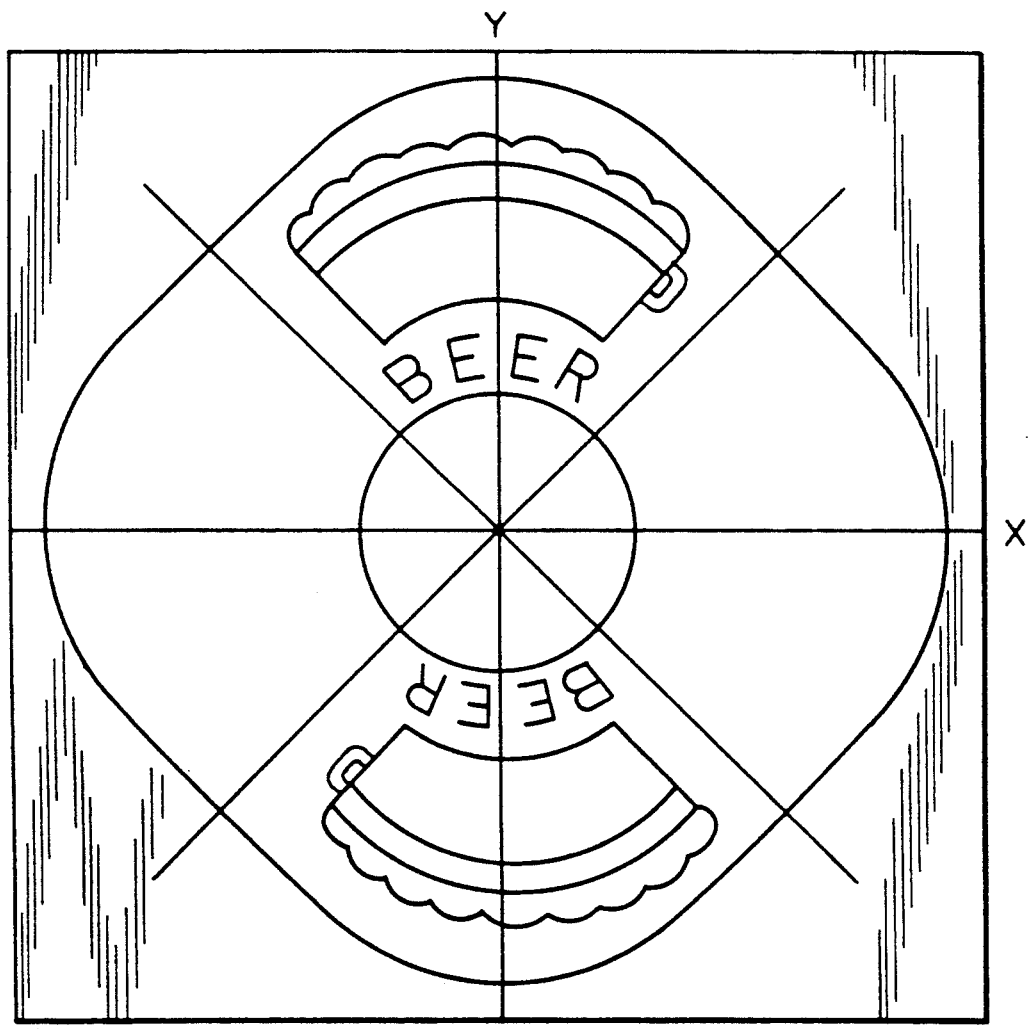
FIG. 15 is a plane view illustrating a plate having a print image formed in due consideration of the anisotropy of the plastic flow at the draw-forming step.

As pointed out hereinbefore, in the portion to be formed into the circumferential side wall portion of the draw-formed can 12, the elongation flow is generated in the height direction of the formed body and the contraction flow is generated in the circumferential direction. These flows are not uniformly generated on the entire surface of the laminate 11 comprising the metal blank 6 or the metal blank 6 and the printed synthetic resin film 11b (collectively referred to as "blank" hereinafter), but an anisotropy is found in each of these flows. FIG. 15 illustrates the anisotropy of the flow of the blank. The elongation is smallest in the rolling direction X at the production of the blank and the direction Y orthogonal thereto, and it is seen that elongation is largest in the direction Z crossing the axes X and Y at an angle of 45°. Accordingly, if the rectangular print layer is merely transformed to an annular print layer and the blank is then printed, greatly elongated printed portions and lowly elongated printed portions appear at intervals of 45° C., and the printed image becomes wavy and the linearity is not maintained in the circumferential direction. Furthermore, the shear of the position in the circumferential direction is generated by this variation of the elongation.

According to the third embodiment of the present invention, a printing plate having an annularly developed print image can be prepared from the rectangular original to be printed, which is shown in FIGS. 5-A and 5-B, by the digital image processing described hereinafter in due consideration of the anisotropy of the plastic flow shown in FIG. 15.

According to this embodiment of the present invention, digital picture element signals on the rectangular coordinate, which are put in the plate-forming computer 53, are developed in an annular plane having an area almost equal to or a little smaller than the area of the rectangular shape of the rectangular coordinate by the deformation processing computer and corrected in due consideration of the anisotropy of the elongation of the laminate and are records as picture element signals or groups of picture element signals on the transformed coordinate, and the picture element signals on the transformed coordinate are read in order of the coordinate.

In general, this processing is accomplished through (i') the formation of a correspondence table between the rectangular coordinate and the annular transformed coordinate in due consideration of the anisotropy of the plastic flow at the draw-forming and (ii') the rewriting of the rectangular coordinate to the transformed coordinate based on the correspondence table.

Referring to FIG. 16 illustrating the step (i') of forming the correspondence table, data of the shear of the image are read in a memory at step (a). Then, at step (b), the size of the rectangular coordinate, that is, the numbers of picture elements in the longitudinal and lateral directions, is appointed. Then, at step (c), a two-dimentional arrangement (memory) A(n,n) having a size sufficient to contain data when the coordinate transformation is carried out in due consideration of the image shear of the rectangular coordinate is prepared. At step (d), the transformation of the rectangular coordinate to an annular plane is carried out in due consideration of the anisotropy of the plastic flow at the draw-forming. This coordinate transformation is carried out in the same manner as described in the first embodiment with reference to FIG. 10-A through FIG. 11-B.

At this coordinate transformation, it is important that the anisotropy of the plastic flow at the draw-forming should be taken into consideration. In the direction Z spaced by 45° from the above-mentioned rolling direction, the elongation in the axial direction of the can (the radial direction of the blank) is largest, and the elongation is smallest in the rolling direction X or the direction orthogonal thereto. Accordingly, it is necessary that the print image applied to the blank should be contracted in correspondence to the increase by this elongation in advance. For this purpose, with respect to many typical positions spaced at predetermined intervals on the rectangular coordinate, data of the image shear in the height direction and circumferential direction are prepared, and based on these data of the image shear, correction for compensating the anisotropy of the plastic flow is effected at the coordinate transformation.

This operation is carried out according to the flow chart shown in FIG. 17. Namely, coordinate values (1) and (2) adjacent to each other in the direction of the axis X of the rectangular coordinate are read and it is judged whether or not these coordinate values are at the set position where the anisotropy of the plastic flow should be taken into consideration. If these coordinate values are at positions other than the above-mentioned set position, the coordinate transformation is performed in the same manner as described in the first embodiment.

In the case where the read coordinate values are at the set position where the anisotropy should be taken into consideration, the image shear data in the height direction and/or the circumferential direction at each position is read to correct the rectangular coordinate value, and then, the above-mentioned coordinate transformation is carried out.

Referring to FIG. 16 again, at step (e), the original rectangular coordinate value is substituted for the element of the arrangement A corresponding to the coordinate value obtained by the transformation. Namely, referring to FIG. 11-A and 11-B, at the transformation of a→a' and b→b', the substitution is effected in the form of $A(a',b') \leftarrow a*\epsilon+b$ (supposing that b is a number of p figures, $\epsilon$ is a number of $10^p$).

The operations of steps (d) and (e) are performed on all of the rectangular coordinate values.

Finally, the obtained two-dimentional arrangement A(n,n) is recorded in an external memory device such as a magnetic disk, and the formation of the correspondence table is completed. In the present invention, if this correspondence table is once formed, the correspondence table can be used for the same draw-formed body repeatedly irrespectively of changes of the original or design.

The operation (ii') of rewriting the rectangular coordinate to the transformed coordinate according to the formed correspondence table is performed in the same manner as described in the first embodiment with reference to FIG. 13.

According to this embodiment of the present invention, by the above-mentioned operations, the picture element signal [B(a,b)] on the rectangular coordinate can be made to correspond to the transformed coordinate formed by developing the rectangular coordinate in an annular plane having an area almost equal to or a little smaller than the area of the rectangular shape of the rectangular coordinate and making a correction in due consideration of the anisotropy of the elongation of the laminate and can be converted to a picture element signal or a group of picture element signals [C(a',b')] and furthermore, the picture element signals on the transformed coordinate can be read and put out in order of the coordinate.

The picture element signals on this transformed coordinate are fed in order of the coordinate to the output scanning mechanism 55 to form a printing plate or block copy.

(Fourth Embodiment)

According to the fourth embodiment of the present invention, picture element signals on the transformed coordinate where a correction is made for compensating the anisotropy of the elongation of the blank can be obtained from picture element signals on the rectangular coordinate directly without preparing the correspondence table described above in the third embodiment.

According to this embodiment of the present invention, by the deformation processing computer 57, the rectangular coordinate is subjected to the digital coordinate transformation to an annular plane having an area almost equal to or a little smaller than the area of the rectangular shape of the rectangular coordinate and being corrected in due consideration of the anisotropy of the elongation of the laminate, new coordinate values of picture elements present in spaces between the transformed coordinate values corresponding to the adjacent picture elements of the rectangular coordinate are calculated, the picture element signals on the rectangular coordinate put in the plate-forming computer 53 are substituted for the corresponding transformed coordinate values and new coordinate values, and the picture element signals on the transformed coordinate are read and put out in order of the coordinate.

Figure 18B:
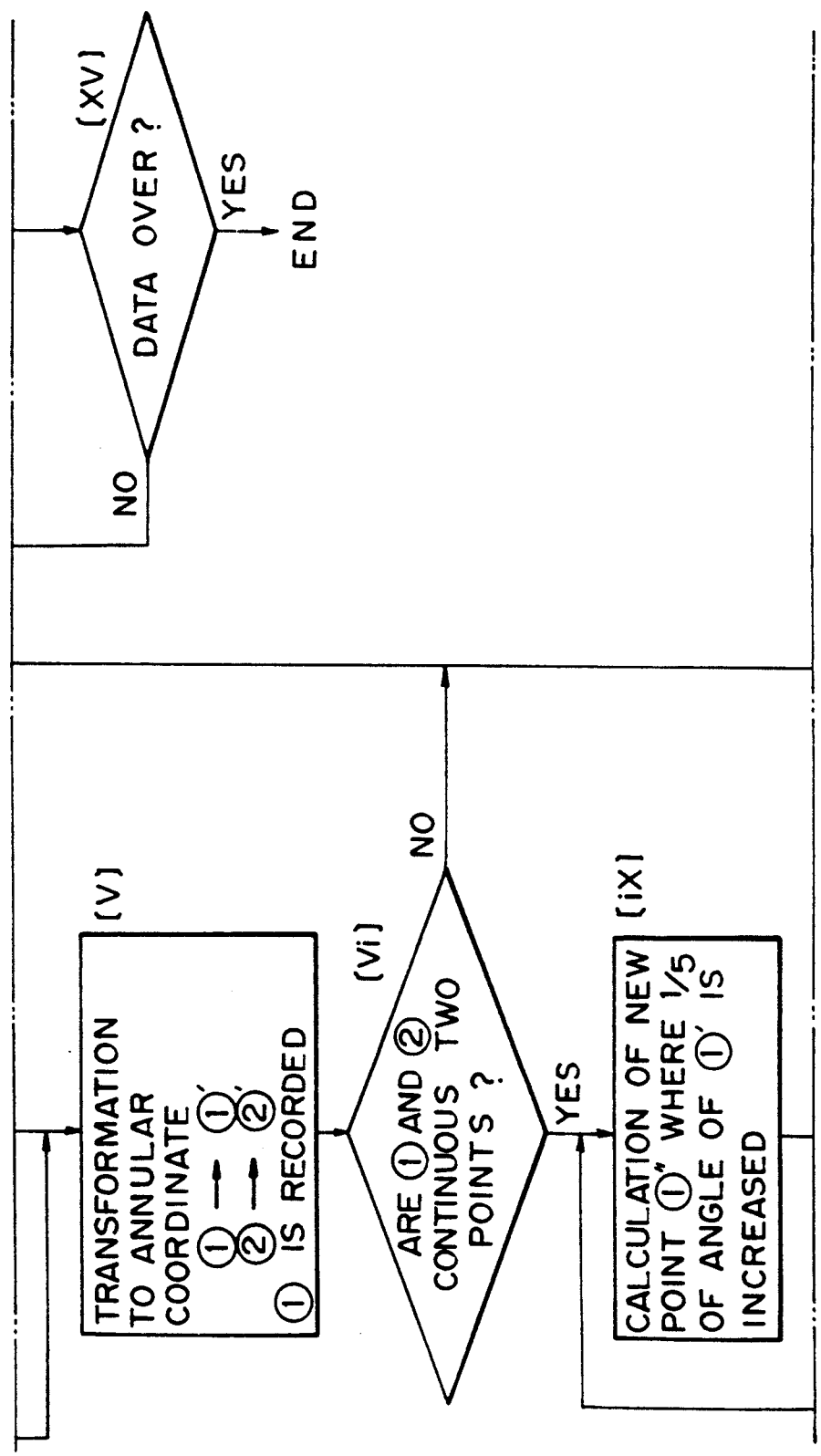
Figure 18C:
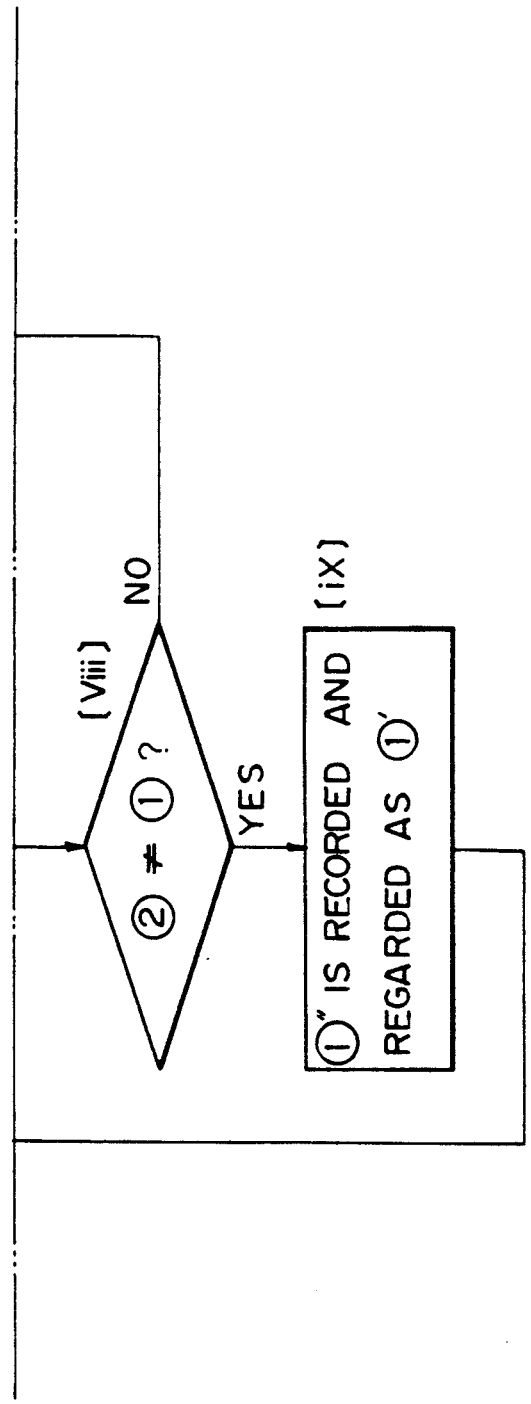

Referring to the flow chart of FIG. 18 illustrating this operation, at step (i), data (1) is read from the digital picture element signal data emitted from the plate-forming computer 53, and then, at step (ii), data (2) adjacent to the data (1) in the direction of the axis X of the rectangular coordinate is read.

At step (iii), it is judged whether or not the rectangular coordinate values of data (1) and (2) read at steps (i) and (ii) are at the set position where the anisotropy should be taken into consideration. In the case where the rectangular coordinate values are at this set position, at step (iv), data of the image shear in the height direction and/or the circumferential direction at each position is read to correct the rectangular coordinate values. Then, at step (v), the coordinate transformation is carried out. If the data (1) and (2) are at positions other than the set position where the anisotropy should be taken into consideration, the coordinate transformation at step (v) is directly carried out.

At step (v), the coordinate conversion of data (1) and (1') and data (2) to data (2') is effected between the rectangular coordinate and the transformed coordinate formed by converting the rectangular coordinate to the annular plane having an area almost equal to or a little smaller than the area of the rectangular coordinate, and the data (1') is recorded.

This coordinate transformation is accomplished by the same means as described with reference to FIGS. 11-A and 11-B. The respective steps are the same as those shown in FIG. 14.

Referring to FIG. 18, in the case where it is judged at step (xi) that reading of the rectangular coordinate data has been completed, the picture element coordinate value in the longitudinal direction is set at y=1 at step (xii), and among the coordinate-transformed and recorded data, the data where the value of the coordinate Y is y is read at step (xiii).

Then, At step (xiv), the read data are arranged in order of the smallness of the value of the coordinate X and recorded (sorted). At step (xv), it is judged whether recording of the coordinate-transformed data has been completed. If the recording has not been completed, y is set at y+1 at step (xvi), and reading of the data is carried out at step (xiii), and the subsequent operations are conducted.

Thus, the coordinate-transformed data are put into the plate-forming computer 53 in order of the recording.

According to the present invention, by the above-mentioned operations, the picture element on the rectangular coordinate is converted to a picture element signal or a group of picture element signals on the transformed coordinate in correspondence to the transformed coordinate formed by developing the rectangular coordinate in an annular plane having area almost equal to or a little smaller than the area of the rectangular shape of the rectangular coordinate and being corrected in due consideration of the anisotropy of the plastic flow at the draw-forming, and the picture element signals on the transformed coordinate are read and put out in order of the coordinate.

The picture element signals on this transformed coordinate are fed in order of the coordinate to the output scanning mechanism 55 to form a printing plate or block copy.

According to the third and fourth embodiments of the present invention, the digital picture element signals of the rectangular coordinate are converted to picture element signals on a transformed coordinate formed by developing the rectangular coordinate of the original in an annular plane in due consideration of the anisotropy of the plastic flow at the draw-forming by means of a computer, whereby influences of the camera photographing and development treatment on the image, such as fading of the image and changing of the concentration, can be prevented and a blank for the draw-forming can be preliminarily printed with excellent fidelity and reproducibility, and the number of steps and the processing time, required for the formation of a printing plate, can be drastically reduced and shortened. Furthermore, the image deformation owing to the difference of the direction can be completely coped with at the draw-forming processing, and the image quality can be easily improved. Moreover, if the correspondence table to the transformed coordinate is formed according to the third embodiment of the present invention, the correspondence table can be used for cans of the same kind repeatedly irrespectively of changes of the design and original, and rapid processing become possible.

Still further, if the coordinate transformation is carried out according to the fourth embodiment of the present invention, a printing plate can be promptly formed by using a computer having a relatively small capacity.

(Respective Mechanism)

A known input mechanism of the cylindrical scanning or plane scanning system where an original is read line by line in the direction of the axis X (main scanning) and then, the original is read line by line in the direction of the axis Y (subsidiary scanning) can be used as the input scanning mechanism 52, and the reading scanning is carried out by detecting reflected light or transmitted light by a photomultiplier tube, a phototransistor or a charge coupling device. In general, a multi-color original is color-resolved into cyan, magenta, yellow and black, and the input scanning is then carried out. Different numbers of scanning lines can be adopted for a pattern original and a letter original. A device of this type is ordinarily marked as a scanner and is easily available.

The plate-forming computer 53 comprises a central processing unit (CPU) for receiving and analyzing input and output commands, working various programs and controlling input and output devices, a terminal equipment for issuing instructions to central processing unit (CPU), and a station for carrying out the image processing and editing, and the computer 53 further comprises a disk drive for use in storing systems and various files, and a magnetic tape device for reading the systems and saving and restoring the files. As a typical instance of the plate-forming computer, there can be mentioned Response 300 Series marketed by Sytec, Israel. Furthermore, there can be used plate-forming computers such as Studio 800 Series (Crossfield, Great Britain), Chromacom System (Rudolf Hell, Wet Germany), Pagematic System (Dai-Nippon Ink Kagaku Kogyo) and Sigmagraph System 2000 (Dai-Nippon Screen Seizo).

A known scanning recording system can be adopted as the output scanning mechanism 55. For example, there can be adopted various systems utilizing a silver salt photographing method, a dry silver recording method, an electrophotographic method, an electrostatic recording method, a negative or positive photoresist recording method, a photopolymer recording method, a diazo photographing method, a gelatin dichromate plate-forming method, an electrolytic recording method, a discharge breakdown recording method, an electric thermal recording method, a thermal recording method, a pressure recording method, an ink jet recording method or the like. As the scanning system, there can be adopted mechanical scanning systems such as a cylinder scanning system, a rotary disk scanning system, a helix cylinder scanning system, a belt type plane scanning system and a multi-needle plane scanning system, electron tube scanning systems such as a flying spot tube system, an optical fiber system and a multi-needle electrode tube system, and solid scanning systems such as a multi-needle electrode head system.

In the present invention, among these various recording systems, a laser recording system is preferably used for reading an original and forming a printing plate, because this recording system is advantageous in that light energy can be concentrated on a micro-fine region of the wavelength order, light beams can be scanned over a broad region and on-off scanning can be performed at a high speed. He-Ne laser, Ar laser, He-Cd laser and the like can be used as the laser beam source.

In the present invention, the picture element density in the rectangular coordinate and final transformed coordinate can be changed over a broad region according to need, but it is general preferred that the picture element density be 12 to 100 dots/mm. In case of a pattern original, it is especially preferred that the picture element density be 12 to 14 dots/mm, and in case of a letter original, it is preferred that the picture element density be 36 to 100 dots/mm.

Figure 19:
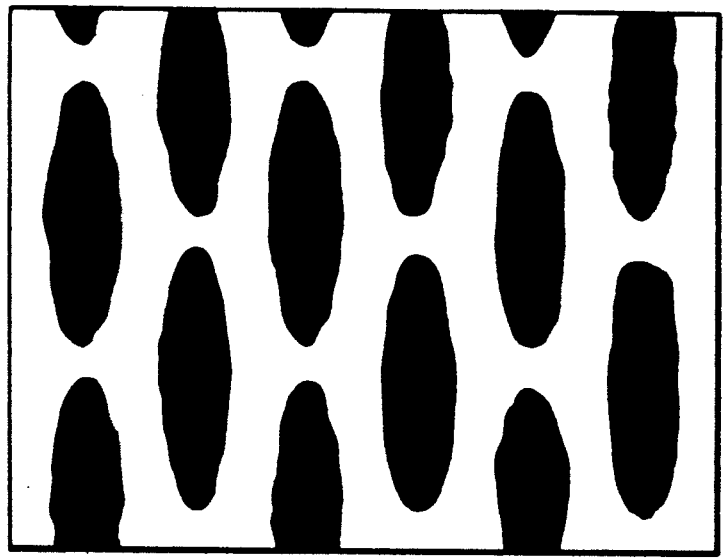
FIG. 19 is a diagram illustrating an example of long dots.

A universal line screen or a long-dot screen is used as the dot-resolving screen for forming a printing plate. A universal line screen having a pitch of 50 to 300 lines/inch, especially 100 to 200 lines/inch, is advantageously used. A long-dot screen having dots of a shape of a long circle or long ellipse, a rectangular shape, a shape of a longrhomb or a shape of a long prallelogram can be used as the long-dot screen. An example of the arrangement of long dots is shown in FIG. 19.

In the production of a printing plate for forming a multi-color image, cyan, magenta, yellow and black plates are prepared by the output scanning mechanism 55. The principle of the divided multi-color exposure for the production of each of these plates is as described hereinbefore. However, in the production of these plates, it is preferred that the screen angle be changed for the respective plates. Examples of the screen angles of the respective plates are illustrated in FIG. 20.

Furthermore, there can be adopted a method in which a negative print is once formed and a printing plate is prepared from this negative print by reverse printing.

In the present invention, the image shear data of the rectangular coordinate can be processed by setting on the rectangular coordinate a region of positions where the anisotropy of the plastic flow of the blank at the draw-forming should be taken into consideration and recording position shear data within this set region in an internal memory of the deformation processing computer 57 or an external memory.

In the circumferential side wall portion of the can, the degree of the plastic flow is low at a part adjoining to the bottom of the can and the degree of the plastic flow is gradually increased toward the upper end of the can. Accordingly, if the portion above the point of a height corresponding to $\frac{1}{4}$, especially $\frac{1}{3}$, of the total height from the bottom is designated as the portion of the positions where the anisotropy should be taken into consideration, satisfactory results can be obtained with respect to the prevention of the image shear. In connection with the circumferential direction, the entire circumference can be regarded as the region of the positions where the anisotropy should be taken into consideration. However, since the image shear is caused axially symmetrically with respect to the axes X and Y and the axis Z, as shown in FIG. 15, if image shear data in a range of an angle of up to 45° between the axes X and Z are prepared, these data can be used as the image shear data for the entire circumference. As the space between every two adjacent positions for collecting image shear data is fine, the anisotropy can be corrected precisely, but a large memory becomes necessary. It has been found that satisfactory correction can be performed if the space between adjacent image shear data on the rectangular coordinate is 0.1 to 2 mm, especially 0.5 to 1 mm. The image shear data can be easily obtained by printing a synthetic resin film by using a printing plate formed from a rectangular original without consideration of the anisotropy of the plastic flow, laminating the printed synthetic resin film on a metal blank, draw-forming the laminate, winding the rectangular original on the circumferential side wall portion of the obtained draw-formed can, and measuring the shear between the original and the print image on the circumferential side wall portion.

The obtained image shear data can be used repeatedly irrespectively of the print design, so far as a certain metal blank is subjected to certain draw-forming.

As the metal blank of the can, there can be used an untreated steel sheet (blank plate), various surface-treated steel sheets such as a tin-deposited steel sheet (tinplate), a zin-deposited steel sheet, an aluminum-deposited steel sheet, a nickel-deposited steel sheet, a chromium-deposited steel sheet and other deposited steel sheets, electrolytically treated steel sheets such as an electrolytically chromated steel sheet, chemically treated steel sheets such as chromated and/or phosphated steel sheets, metal sheets of light metals such as aluminum, and composite materials thereof.

The thickness of the metal blank differs according to the final dimension of the vessel and the kind of the metal blank, but it is preferred that the thickness of the metal blank be 0.01 to 0.5 mm, especially 0.02 to 0.35 mm.

Prior to the printing operation, the metal blank can be coated with a paint having excellent processability and corrosion resistance, such as an epoxy/phenolic paint, an epoxy/aminoplast paint, an epoxy/acrylic paint or an epoxy/vinyl paint. Furthermore, the surface to be printed can be coated with a whitening paint formed by incorporating titanium oxide or the like into a paint as mentioned above.

An optional resin film can be used as the synthetic resin film, so far as formation of a film is possible and the film can be draw-formed in the form of a laminate. Appropriate resins are described below, though the resin that can be used is not limited to those exemplified below.

(a) Polyolefins such as polypropylene, polyethylene, polybutene-1, a propylene/ethylene copolymer, a propylene/butene-1 copolymer, an ethylene/vinyl acetate copolymer, an ion-crosslinked olefin copolymer (ionomer) and an ethylene/ethyl acrylate copolymer.

(b) Polyamides, especially those having recurring units represented by the following general formula:

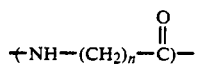

or

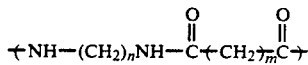

wherein n is a number of from 3 to 13, and m is a number of from 4 to 11,
such as poly-$\omega$-aminocaproic acid, poly-$\omega$-aminoheptanoic acid, poly-$\omega$-aminocaprylic acid, poly-$\omega$-aminopelargonic acid, poly-$\omega$-aminodecanoic acid, poly-$\omega$-aminoundecanoic acid, poly-$\omega$-aminododecanoic acid, poly-$\omega$-aminotridecanoic acid, polyhexamethylene adipamide, polyhexamethylene sebacamide, polyhexamethylene dodecamide, polyhexamethylene tridecamide, polydecamethylene adipamide, polydecamethylene sebacamide, polydecamethylene dodecamide, polydecamethylene tridecamide, polydodecamethylene adipamide, polydodecamethylenesebacamide, polydodecamethylene dodecamide, polydodecamethylene tridecamide, polytridecamethylene adipamide, polytridecamethylene sebacamide, polytridecamethylene dodecamide, polytridecamethylene tridecamide, polyhexamethylene azelamide, polydecamethylene azelamide, polydodecamethylene azelamide, polytridecamethylene azelamide, and copolymers thereof.

(c) polyesters, especially those having recurring units represented by the following general formula:

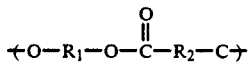

or

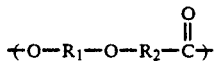

wherein $R_1$ represents an alkylene group having 2 to 6 carbon atoms, and $R_2$ represents an alkylene group having 2 to 24 carbon atoms or an arylene group,
such as polyethylene terephthalate, polyethylene terephthalate/isophthalate, polytetramethylene terephthalate, polyethylene/tetramethylene terephthalate, polytetramethylene terephthalate/isophthalate, polyethylene/tetramethylene terephthalate/isophthalate, polytetramethylene/ethylene terephthalate, polyethylene/tetramethylene terephthalate/isophthalate, polyethylene terephthalate/hydroxybenzoate, and blends thereof.

(d) Others, for example, regenerated celluloses such as cellophane, cellulose derivatives such as nitrocellulose, cellulose diacetate and cellulose triacetate, polyvinyl chloride, polyvinylidene chlorides such as Saran Film, polyvinyl alcohol, polystyrene, fluorine resins, polyarylates, polyphenylsulfide, polysulfones, polyether-imides, polyether-sulfones, fluorine-containing copolymers, polyoxybenzylene, polyether-ether-ketones, polyamideimides, polyimides and other special engineering plastics.

From the viewpoint of the heat resistance, it is preferred that the synthetic resin film be uniaxially or biaxially molecularly oriented and heat-set. It is preferred that the film thickness be 10 to 150 $\mu$m, especially 30 to 100 $\mu$m. If the film thickness is too small and below this range, the covering effect against corrosion by the resin film is often degraded, and if the film thickness is too large and exceeds this range, the draw formability is degraded.

In order to improve the deep-draw formability, it is preferred that an inorganic filler or pigment be incorporated into the resin film layer.

As pointed out hereinbefore, the printing can be applied to either the surface confronting the metal blank or the outer side surface in the synthetic resin film. In the case where the printing is applied to the outer surface, in order to prevent the print layer from being damaged or peeled, a film or coating is preferably formed on the print layer. As the paint that can be used for this purpose, there can be mentioned thermoplastic resin paints, for example, modified epoxy paints such as a phenol/epoxy paint, an amino/epoxy paint and an epoxy/ester paint, vinyl and modified vinyl paints such as a vinyl chloride/vinyl acetate copolymer, a partially saponified vinyl chloride/vinyl acetate copolymer, a vinyl chloride/vinyl acetate/maleic anhydride copolymer and epoxy-modified, epoxyamino-modified and and epoxyphenol-modified vinyl resins, acrylic resin paints, oil paints, alkyd paints, polyester paints, and synthetic rubber paints such as a styrene/butadiene copolymer, though the paint that can be used is not limited to those exemplified above.

It is preferred that the thickness of the coating be 1 to 30 $\mu$m, especially 3 to 20 $\mu$m.

The printing can be carried out be using a printing plate prepared by the above-mentioned process according to an optional printing method selected from the planographic printing method, the offset printing method, the screen printing method, the gravure printing method, the letterpress printing method, the intaglio printing method and the electrophotographic printing method.

Known printing inks and ultraviolet ray-curable inks can be used as the printing ink.

The lamination of the synthetic resin film and the metal blank can be performed according to a known lamination method such as an extrusion lamination method or a sandwich lamination method. As the adhesive to be used for the lamination, there can be mentioned an isocyanate type adhesive, an epoxy type adhesive and an acid-modified olefin resin adhesive. A polyester-urethane type adhesive and a polyester-epoxy-urethane type adhesive are preferably used.

As the polyester-urethane adhesive, there can be mentioned an adhesive obtained by reacting a polyester having terminal hydroxyl groups with a diisocyanate and crosslinking the obtained isocyanate-terminated polyester-urethane with water or a polyhydric alcohol as the crosslinking agent, and an adhesive obtained by reacting a polyhydric alcohol, a polybasic carboxylic acid and a diisocyanate and crosslinking the obtained hydroxyl group-terminated polyester-urethane with a diisocyanate as the crosslinking agent. The latter adhesive is especially preferably used.

As the polybasic carboxylic acid constituting the polyester, there can be mentioned succinic acid, adipic acid, sebacic acid and decane-carboxylic acid, and as the polyhydric alcohol, there can be mentioned ethylene glycol, propylene glycol, butanediol, glycerol, neopentane glycol, erythritol, sorbitol and mannitol. As the diisocyanate, there can be mentioned xylylene diisocyanate, tylylene diisocyanate, cyclohexane diisocyanate and isophorone diisocyanate.

A polyester-urethane adhesive of this type provides a strong adhesion bond, generally a bonding force of 1.4 to 1.8 kg/15 mm, between a metal blank and a plastic film by dint of the presence of urethane groups, and since hard segments introduced from the diisocyanate and soft segments introduced from the polyesters are present in the main chain, a good elastic modulus as mentioned above, especially an elastic modulus of 4000 to 9000 kg/cm$^2$, is given.

As the polyester-epoxy-urethane adhesive, there can be mentioned an adhesive composed of a composition comprising a hydroxyl group-terminated polyester, an epoxy resin and a diisocyanate crosslinking agent. As the polybasic carboxylic acid and polyhydric alcohol constituting the hydroxyl group-terminated polyester and the diisocyanate, there can be used those exemplified above. An epoxy resin obtained by reacting bisphenol A with epichlorohydrin is used as the epoxy resin.

The polyester-epoxy-urethane adhesive shows a bonding force as high as that of the above-mentioned polyester-urethane adhesive by dint of the presence of urethane groups, and the elastic modulus is in the range of 1020 to 5100 kg/cm$^2$.

As the acid-modified olefin resin adhesive there can be used olefin resins such as polypropylene, polyethylene and a propylene/ethylene copolymer, grafted with an ethylenically unsaturated carboxylic acid or anhydride thereof, such as maleic anhydride, acrylic acid or methacrylic acid.

The lamination bonding between the metal blank and the synthetic resin film can be accomplished by coating an organic solvent solution or dispersion of an adhesive as mentioned above on the surface of the metal blank or film, evaporating the solvent and compressing the metal blank and film. The amount coated of the adhesive is preferably 4.0 to 8.0 g/m$^2$.

For the production of a draw-forming can, the above-mentioned printed laminate is punched into a circular sheet or the like and the circular sheet or the like is subjected to single-stage or multi-stage draw-forming processing between a drawing punch and a drawing die. The total draw ratio expressed by the ratio of the diameter of the blank to the diameter of the bottom of the draw-formed vessel is preferably in the range of from 1.2 to 3.0 and preferably in the range of from 1.3 to 2.9.

At the draw-forming and redraw-forming, it is preferred that the covered metal sheet or cup be processed in the state coated with a lubricant such as liquid paraffin, edible oil, hydrogenated edible oil, palm oil, natural wax or polyethylene wax. The amount coated of the lubricant differs according to the kind of the lubricant, but it is preferred that the lubricant be coated in an amount of 0.1 to 10 mg/dm$^2$, especially 0.2 to 5 mg/dm$^2$. Coating of the lubricant is accomplished by spraying the melt of the lubricant to the surface.

The draw-forming can be carried out at room temperature but preferably, the draw-forming temperature is 20° to 95° C., especially 20° to 90° C.

The draw-formed can is subjected to various treatments such as flange trimming, doming, neck-in processing and flange processing to obtain a can barrel for a two-piece can.

According to the present invention, although the draw ratio based on H/D is as high as at least 1 and the thickness of the side wall portion is prominently reduced, a print image faithful to an original image can be manifested on the side wall portion of the thickness-reduced deep-draw-formed can. Furthermore, there can be obtained a draw-formed printed can, in which the linearity of the print image in the circumferential direction at the upper part of the side wall portion is maintained so that the shear between the rolling direction and the direction crossing the rolling direction at 45° is smaller than 1% of the height of the side wall portion, and the linearity in the axial direction of the print image is maintained so that the shear at a position separate by about 22° from the rolling direction is smaller than 1% of the length of the outer circumference of the side wall portion. Furthermore, by dividing at least the outer circumferential portion of the annular image into a plurality of regions and halftone-separating these regions so that the longitudinal directions of universal lines or long dots are oriented substantially to the center of the annular plane, undersirable formation of stripe patterns caused by the elongation flow in the height direction of the blank and the contraction flow in the circumferential direction of the blank can be controlled and the print image can be faithfully reproduced.

EXAMPLES

Example 1

A metal blank was prepared by coating an inner surface paint on the surface, to be formed into an inner surface of a final can, of a tin-free steel sheet having a thickness of 0.18 mm and a tempering degree of DR-9 and applying a white coating to the surface to be formed into an outer surface.

A rectangular print image as shown in FIG. 5-B, in which h was 122.26 mm and l was 208.21 mm, was used, and digital picture elements of the original were put into a plate-making computer 53 as shown in FIG. 8 by an input scanning mechanism 52 as shown in FIG. 53. Chromagraph 299 Scanner System was used as the input scanning mechanism and Response 320 System was used as the plate-making computer. The size of the digital image put into the computer was such that h was 4401 (picture elements) and l was 7496 (picture elements).

The image data put in the computer was put out into a deformation processing computer 57 as shown in FIG. 8. Facom M340S Computer System was used as the deformation processing computer. In this computer, according to the method shown in FIGS. 10-A and 10-B, the side wall portion was elongated in the height direction by draw-redraw-forming, and the contraction processing was carried out in the height direction in due consideration of the reduction of the thickness. Furthermore, according to the method shown in FIGS. 11-A, 11-B and 18, the rectangular coordinate was transformed to an annular coordinate in due consideration of the plastic flow in the height direction at the draw-forming. Referring to FIGS. 11-A and 11-B illustrating the coordinate transformation, after the contraction, 1 was 3521, m was 7496 and n was 6400.

The coordinate-transformed digital picture element signals were put into the plate-making computer again, and a printing plate having an image annularly developed in due consideration of the plastic flow in the height direction and the anisotropy thereof, shown in FIG. 15, was formed by an output scanning mechanism 55 as shown in FIG. 8. ELPII Laser Plotter System was used as the output scanning mechanism.

By using the formed printing plate, the white coating applied surface of the metal blank was printed according to the offset printing method.

At the shearing step shown in FIG. 7-A, the printed metal blank was punched into a circular blank having a diameter of 179 mm.

Then, at the predrawing step shown in FIG. 7-B and the redrawing step including three cycles of bending and rebending, shown in FIG. 7-C, a thickness-reduced draw-formed can was prepared from the circular blank.

The preparation conditions of the redrawing step for performing the thickness reduction and draw-forming were as shown below.

Curvature radius (Rd) of die: 2.0 Ts
Blank holding force (BHF): 5 tons
Final punch diameter: 65.9 mm The measurable characteristics of the prepared thickness-reduced draw-formed printed can were as follows.

Can height/can diameter (H/D): 1.9
Side wall thickness/bottom thickness (Tw/Ts): 0.8
Shear quantity of print image in the side wall portion (position of height of 100 mm from can bottom)
shear in axial direction: below 2%
shear in the circumferential direction: below 1%
Content: 370 ml In the so-prepared thickness-reduced draw-formed printed can according to the present invention, the original rectangular print original was faithfully reproduced and the shear quantity was very small.

Comparative Example 1

A printing plate was prepared by carrying out the image-forming processing with the same size as that of the rectangular print original without consideration of the elongation of the side wall portion in the height direction at the draw-redraw-forming, and the metal blank used in Example 1 was printed by using this printing plate according to the offset printing method.

The preparation conditions at the draw-redrawing step were within the range customarily adopted.

The significant difference from the preparation conditions adopted in Example 1 was that the curvature radius (Rd) of the die was changed to 10 Ts, and other conditions were substantially the same as in Example 1.

The measurable characteristics of the draw-formed printed can were the can height/can diameter ratio (H/D) of about 1.5, the side wall thickness/bottom thickness ratio (Tw/Ts) of at least 1.2, and the content of about 300 ml.

The shear quantity of the print image in the side wall portion was much larger than in Example 1. Namely, at the position of a height of 100 mm from the can bottom, the shear quantity in the axial direction was 11 to 12% and the shear quantity in the circumferential direction was 12 to 13%. Furthermore, a distortion of the print image confirmable with the naked eye was observed on the entire surface, and the rectangular print original was not faithfully reproduced.

Example 2

An Al-Mg type aluminum allot sheet having a thickness of 0.23 mm was used as the metal blank 16 shown in FIG. 6-A.

A thickness-reduced draw-formed printed can was prepared from this metal blank in the same manner as described in Example 1 except that the blank holding force was changed to 1.5 tons at the redraw-forming step shown in FIG. 7-C.

The shear quantity of the print image in the side wall portion of the draw-formed printed can at the position of a height of 100 mm from the can bottom was below 2% in the axial direction and below 1% in the circumferential direction. Namely, a thickness-reduced draw-formed printed can of aluminum in which the rectangular print original was faithfully reproduced and the shear quantity was small was obtained.

Example 3

A metal blank formed by coated an inner surface paint on the surface, to be formed into the inner surface of the final can, of a tin-free steel sheet having a thickness of 0.21 mm and a tempering degree of T-4CA and applying a white coating to the surface to be formed into the outer surface of the final can was used as the metal blank 16 shown in FIG. 6-A.

A print original as shown in FIG. 5-A, in which h was 27.5 mm and l was 206.25 mm, was put as digital picture element signals into a plate-making plate computer 53 as shown in FIG. 8 by an input scanning mechanism 52 as shown in FIG. 8. Chromagraph 299 Scanner System was used as the input scanning mechanism, and Response 320 System was used as the plate-making computer. The digital image put into the computer had such a size that h was 990 (picture elements) and l was 7425 (picture elements).

The image data was put out into a deformation processing computer 57 as shown in FIG. 8. Facom M 340S Computer System was used as the deformation processing computer. This computer transforms a rectangular coordinate to an annular coordinate in view of the anisotropy of the plastic flow at the draw-forming according to the method disclosed in Japanese Unexamined Patent Publication No. 62-93030.

The coordinate-transformed digital picture element signals were put into the plate-making computer again, and by an output scanning mechanism 55 as shown in FIG. 8, a halftone-separated printing plate which was divided into a plurality of regions A1, B1, A2 and B2 as shown in FIGS. 3-A through 3-C and in which in each region, the longitudinal directions of the universal lines were oriented substantially to the center of the annular plane was formed. ERAY Laser Plotter System was used as the output scanning mechanism.

The surface, to be formed into the outer surface of the final can, of the above-mentioned metal blank was printed by the so-prepared printing plate according to the offset printing method.

The printed metal blank was punched into a circular blank having a diameter of 126.5 mm at the shearing step shown in FIG. 7-A. A draw-formed can as shown in FIG. 4-A was prepared from this can blank at the step of two cycles of the draw-forming shown in FIG. 7-B. The preparation conditions were as follows.

Blank holding pressure: 4 kg/cm²
Diameter of drawing punch: 64.9 mm
Draw ratio: 1.95

In the print image in the side wall portion of the obtained draw-formed can, undesirable formation of a strip pattern was prevented, and a good draw-formed printed can in which the rectangular print original was faithfully reproduced was obtained.

Comparative Example 2

The outer surface side of a metal blank having the same characteristics as those of the metal blank used in Example 3 was printed by using the same rectangular print image as used in Example 3 according to the offset printing method in the same manner as described in Example 3 except that when a printing plate was formed, dots 4 shown in FIG. 2-A were used at the halftone separation by the output scanning mechanism 55 shown in FIG. 8 and the division into a plurality of regions was not effected. By using the obtained printed metal blank, the draw-forming was carried out in the same manner as described in Example 3.

Undersirable formation of a stripe pattern was caused in the print image on the side wall portion of the draw-formed printed can, and a draw-formed printed can in which the rectangular print original was faithfully reproduced was not obtained.

Example 4

A metal blank prepared by coating an inner surface paint on the surface, to be formed into the inner surface of the final can, of a tin-free steel sheet having a thickness of 0.18 mm and a tempering degree of DR-9 and applying a white coating to the surface to be formed into the outer surface of the final can was used as the metal blank 16 shown in FIG. 6-A.

A rectangular print original in which h was 122.26 mm and 1 was 208.21 mm was used as the rectangular print original shown in FIG. 5-A. According to the same method as described in Example 3, the contraction processing in the height direction of the rectangular original digital image was carried out by the deformation processing computer 57 shown in FIG. 8 while taking it into consideration that the side wall portion was elongated in the height direction at the draw-redraw-forming and the thickness was reduced. Then, the transformation of the rectangular coordinate to an annular coordinate was carried out in due consideration of the plastic flow in the height direction at the draw-forming and the anisotropy thereof. The coordinate-transformed digital picture element signals were put into the plate-making computer 53 shown in FIG. 9 again, and a halftone-separated printing plate was formed in the same manner as described in Example 3.

The outer surface side of the above-mentioned metal blank was printed by using the obtained printing plate according to the offset printing method.

The printed metal blank was punched into a circular blank having a diameter of 179 mm at the shearing step shown in FIG. 7-A. A thickness-reduced draw-formed can was prepared from this circular blank through the predrawing step shown in FIG. 7-B and the redrawing steps of three cycles of bending and rebending. The preparation conditions of the redrawing step for performing the reduction of the thickness and the draw-forming were as follows.

Curvature radius (Rd) of die: 2.0 Ts
Blank holding force (BHF): 5 tons
Diameter of final punch: 65.9 mm The measurable characteristics of the prepared thickness-reduced draw-formed printed can were as follows.

Can height/can diameter (H/D): 1.9
Side wall thickness/bottom thickness (Tw/Ts): 0.8
Content: 370 ml In the print image on the side wall portion of the obtained thickness-reduced draw-formed can, undesirable formation of a stripe pattern was prevented, and a good thickness-reduced draw-formed printed can in which the rectangular print original was faithfully reproduced was obtained.

What is claimed is:

1. A process for the preparation of a draw-formed printed can having a print image at least on a side wall portion, which comprises the steps of:

developing a rectangular original image to be printed in an annular plane to form an annular image on a printing plate, dividing at least a circumferential portion of the annular image into a plurality of regions, half-tone separating the printing plate so that universal lines or longitudinal directions of long dots in the respective regions are printed substantially to the center of the annular plane, printing a metal blank with the half-tone separated printing plate, and draw-forming the printed metal blank, thereby forming a printed can.

2. A process according to claim 1, further comprising performing multiple light exposure on the printing plate, wherein a screen angle is changed for each of the respective regions or each of the groups of the respective regions.

3. A process according to claim 1, wherein the draw-forming step comprises reducing the side wall portion of the printed can.

4. A process for the preparation of a thickness-reduced, draw-formed printed can having a print image on a side wall portion thereof from a deep draw-formed cup, which comprises the steps of:

contracting a rectangular original image to be printed based on the following formula:

$$\frac{l}{lo} = \frac{Tw}{Tb}$$

wherein lo represents height of the rectangular original image, l represents height of a contracted image, Tb represents bottom thickness of the deep draw-formed cup and Tw represents average thickness of the deep draw-formed cup, to form a contracted rectangular image;

developing the contracted rectangular image in an annular plane having substantially the same area as that of a rectangular plane of the contracted rectangular image, to form an annular image on a printing plate, and printing a metal blank using the formed printing plate, draw-forming the printed metal blank into a preliminarily drawn cup and redrawing the preliminarily drawn cup into a deep draw-formed cup using a redrawing die having a small curvature to reduce the thickness of the side wall portion of the cup, thereby forming a printed can.

5. A process for the preparation of a thickness-reduced, draw-formed printed can having a print image on a side wall portion thereof from a deep-draw formed cup, which comprises the steps of:

contracting a rectangular original image to be printed based on the following formula:

$$\frac{l}{lo} = \frac{Tw}{Tb}$$

wherein lo represents height of the rectangular original image, l represents height of the contracted image, Tb represents bottom thickness of the deep draw-formed cup and Tw represents average thickness of the deep draw-formed cup, to form a contracted rectangular image, developing the contracted rectangular image in an annular plane having substantially the same area as that of a rectangular plane of the contracted rectangular image on to a printing plate, wherein the developed contracted rectangular image is corrected by anisotropy of elongation of a metal blank, printing the metal blank using the developed printing plate draw-forming the printed metal blank into a preliminarily drawn cup and redrawing the preliminarily drawn cup into a deep draw-formed cup using a redrawing die having a small curvature to reduce the thickness of a side wall portion of the cup, thereby forming a printed can.

6. A process for the preparation of a thickness reduced, draw-formed printed can having a print image on a side wall portion thereof from a deep-draw formed cup, which comprises the steps of:

converting a rectangular original image to be printed having original rectangular coordinates to a digital picture element signal having contracted rectangular coordinates wherein the conversion is based on the following formula:

$$\frac{l}{lo} = \frac{Tw}{Tb}$$

wherein lo represents height of the original rectangular coordinates, l represents height of the contracted rectangular coordinates, Tb represents bottom thickness of the deep draw-formed cup and Tw represents average thickness of the deep draw-formed cup, transforming the picture element signal having contracted rectangular coordinates to a picture element signal or a group of picture element signals having transformed coordinates formed by developing the contracted rectangular coordinates in an annular plane having an area substantially equal to the area of a rectangular plane of the contracted rectangular coordinates, reading the picture element signal or signals based on the transformed coordinates in order of the coordinates and transforming the transformed coordinates to a blank printing plate, printing a synthetic resin film using the printing plate, laminating the printed synthetic resin film on to a metal blank to form a preliminarily printed metal blank, draw-forming the preliminarily printed metal blank into a preliminarily drawn cup, and redrawing the preliminarily drawn cup into a deep draw-formed cup by using a redrawing die having a small radius of curvature to reduce the thickness of the side wall portion of the cup, thereby forming a printed can.

7. A process according to claim 6, wherein a respective contracted rectangular coordinate is defined by a, b and is transformed to a respective transformed coordinate defined by a', b' so that the following requirements are satisfied:

$$a' = r \sin \theta + o$$

$$b' = r \cos \theta + o$$

wherein a' and b' are integers rounded by counting fractions of 5 and over as a unit and disregarding the rest, and r is the radius of the respective contracted rectangular coordinate, $\theta$ is the angle between the respective contracted coordinate and an axis defining b' and o is the center of the contracted rectangular coordinates, wherein r, $\theta$ and o are represented by the following formulae, respectively:

$$r = \sqrt{\frac{m}{\pi}\left(a + \frac{m}{4\pi}\right)}$$

$$\theta = \frac{2\pi b}{m}$$

$$o = \sqrt{\frac{m}{\pi}\left(l + \frac{m}{4\pi}\right)}$$

wherein l represents height of the respective contracted rectangular coordinate and m represents length of the respective contracted rectangular coordinate.

8. A process according to claim 6, wherein the conversion of the original image having rectangular coordinates to the picture element signal having contracted rectangular coordinates is effected by preparing a correspondence table between the rectangular coordinates and the contracted rectangular coordinates.

9. A process for preparing a thickness-reduced, draw-formed printed can having a print image on a side wall portion thereof from deep draw-formed cup, which comprises the steps of:

converting a rectangular original image to be printed having original rectangular coordinates to a digital picture element signal having contracted rectangular coordinates, wherein the rectangular coordinates are contracted based on the following formula:

$$\frac{l}{lo} = \frac{Tw}{Tb}$$

wherein lo represents height of the original rectangular coordinates, l represents height of the contracted rectangular coordinates, Tb represents bottom thickness of the deep draw-formed cup and Tw represents average thickness of the deep draw-formed cup, developing the rectangular contracted coordinates in an annular plane having an area almost equal to the area of a rectangular plane of the contracted rectangular coordinates, converting the digital picture element signal having contracted rectangular coordinates to a picture element signal or a group of picture element signals having transformed coordinates formed by correcting the annular plane due to anisotropy of elongation of the metal blank in correspondence to the transformation coordinates, reading the digital picture element signal on the transformed coordinates in order of the coordinates and transforming the transformed coordinates to a blank-printing plate, printing a synthetic resin film using the printing plate, laminating the printed synthetic resin film on the metal blank to form a preliminarily printed blank, draw-forming the preliminarily printed metal blank into a preliminarily drawn cup and redrawing the preliminarily drawn cup into a deep draw-formed cup using a redrawing die having a small curvature to reduce the thickness of a side wall portion of the cup, thereby forming a printed can.

10. A process for the preparation of a thickness-reduced, draw-formed printed can having a print image on a side wall portion thereof from a deep draw-formed cup, which comprises the steps of:

contracting a rectangular original image to be printed having original rectangular coordinates based on the following formula:

$$\frac{l}{lo} = \frac{Tw}{Tb}$$

wherein lo represents height of the original rectangular coordinates, l represents height of the contracted rectangular coordinates, Tb represents bottom thickness of the deep draw-formed cup and Tw represents average thickness of the deep draw-formed cup, developing the contracted original image in an annular plane having substantially the same area as that of a rectangular plane of the contracted original image, to form an annular image on a printing plate, dividing at least a circumferential portion of the annular image into a plurality of regions, half-tone separating the printing plate so that universal lines or longitudinal directions of long dots in the respective regions are printed substantially to the center of the annular plane printing the metal blank by using the half-tone separated printing plate, draw-forming the preliminarily printed metal blank into a preliminarily drawn cup and redrawing the preliminarily drawn cup into a deep draw-formed cup by using a redrawing die having a small curvature to reduce the thickness of the side wall portion of the cup, thereby forming a printed can.

* * * * *